US009786935B2

(12) United States Patent
Furusawa et al.

(10) Patent No.: US 9,786,935 B2
(45) Date of Patent: Oct. 10, 2017

(54) FUEL CELL SYSTEM AND FUEL CELL SYSTEM CONTROL METHOD

(71) Applicant: HONDA MOTOR CO., LTD., Tokyo (JP)

(72) Inventors: Koichiro Furusawa, Shimotsuke (JP); Nobutaka Nakajima, Haga-gun (JP); Kaoru Yamazaki, Saitama (JP); Kenichiro Ueda, Utsunomiya (JP); Nobuki Koiwa, Utsunomiya (JP); Kenji Taruya, Utsunomiya (JP); Masakazu Hamachi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 581 days.

(21) Appl. No.: 13/906,876

(22) Filed: May 31, 2013

(65) Prior Publication Data
US 2013/0323539 A1    Dec. 5, 2013

(30) Foreign Application Priority Data

Jun. 4, 2012  (JP) ................................ 2012-127217
Jun. 4, 2012  (JP) ................................ 2012-127218

(51) Int. Cl.
*H01M 8/04*        (2016.01)
*H01M 8/04701*     (2016.01)
(Continued)

(52) U.S. Cl.
CPC ... *H01M 8/04731* (2013.01); *H01M 8/04007* (2013.01); *H01M 8/04029* (2013.01);
(Continued)

(58) Field of Classification Search
None
See application file for complete search history.

(56) References Cited

U.S. PATENT DOCUMENTS

2002/0076583 A1*  6/2002  Reiser ............... H01M 8/04223
                                                    429/429
2002/0136939 A1*  9/2002  Grieve ................ B60L 11/1881
                                                    429/415
(Continued)

FOREIGN PATENT DOCUMENTS

DE   10 2008 058 959 A1   5/2010
DE   10 2009 001 630 A1   9/2010
(Continued)

OTHER PUBLICATIONS

Japanese Notice of Allowance application No. 2012-127218 dated Apr. 1, 2014.
(Continued)

*Primary Examiner* — Barbara Gilliam
*Assistant Examiner* — Adam A Arciero
(74) *Attorney, Agent, or Firm* — Squire Patton Boggs (US) LLP

(57) ABSTRACT

A controller (control portion) of a fuel cell system is provided with a flow path switching control device that switches a thermostat valve (flow path switching valve) so that, after a fuel cell has stopped generating electric power, coolant is supplied to a radiator circulation path until the coolant temperature becomes a second temperature threshold value that is lower than a first temperature threshold value.

12 Claims, 10 Drawing Sheets

(51) Int. Cl.
*H01M 8/04007* (2016.01)
*H01M 8/04828* (2016.01)
*H01M 16/00* (2006.01)
*H01M 8/04029* (2016.01)
*H01M 8/04223* (2016.01)
*H01M 8/0432* (2016.01)
*H01M 8/04746* (2016.01)

(52) U.S. Cl.
CPC ..... *H01M 8/0432* (2013.01); *H01M 8/04223* (2013.01); *H01M 8/04358* (2013.01); *H01M 8/04723* (2013.01); *H01M 8/04768* (2013.01); *H01M 8/04947* (2013.01); *H01M 16/006* (2013.01); *Y02E 60/50* (2013.01)

(56) References Cited

U.S. PATENT DOCUMENTS

| | | | | |
|---|---|---|---|---|
| 2003/0031905 | A1* | 2/2003 | Saito | H01M 8/04007 429/429 |
| 2003/0203255 | A1* | 10/2003 | Clingerman | H01M 8/04007 429/435 |
| 2005/0164060 | A1* | 7/2005 | Valensa | C01B 3/382 392/311 |
| 2010/0100266 | A1* | 4/2010 | Yoshinori | B60K 1/04 701/22 |
| 2012/0077102 | A1* | 3/2012 | Morita | H01M 8/04388 429/429 |
| 2013/0189596 | A1* | 7/2013 | Kawahara | H01M 8/04559 429/413 |

FOREIGN PATENT DOCUMENTS

| | | |
|---|---|---|
| JP | 02-230665 A | 9/1990 |
| JP | 2004-281110 A | 10/2004 |
| JP | 2005-285502 A | 10/2005 |
| JP | 2006-037883 A | 2/2006 |
| JP | 2006-260966 A | 9/2006 |
| JP | 2007-164998 A | 6/2007 |
| JP | 2008-282767 A | 11/2008 |
| JP | 2009 140757 A | 6/2009 |
| JP | 2010-067394 A | 3/2010 |
| JP | 2010-153067 A | 7/2010 |
| JP | 2010-282929 A | 12/2010 |
| WO | 2010/060543 A1 | 6/2010 |

OTHER PUBLICATIONS

German Search Report application No. DE 10 2013 210 098.1 dated Jun. 21, 2013.

Japanese Notice of Allowance application No. 2012-127217 dated Jan. 14, 2014.

Japanese Notice of Reasons for Rejection application No. 2012-127218 dated Jan. 14, 2014.

* cited by examiner

FUEL CELL SYSTEM AND FUEL CELL SYSTEM CONTROL METHOD

CROSS-REFERENCE TO RELATED APPLICATION

Priority is claimed on Japanese Patent Application No. 2012-127217, filed Jun. 4, 2012, and Japanese Patent Application No. 2012-127218, filed Jun. 4, 2012, the contents of which are incorporated herein by reference.

BACKGROUND

Field of the Invention

The present invention relates to a fuel cell system and a fuel cell system control method.

Description of Related Art

As a fuel cell, there is known a fuel cell stack, in which: a membrane electrode structure is formed by sandwiching a solid polymer electrolyte membrane from both sides thereof with an anode electrode and a cathode electrode; a pair of separators are arranged on both sides of this membrane electrode structure to configure a flat plate-shaped unit fuel cell (hereunder, referred to as "unit cell"); and a plurality of these unit cells are laminated. In this fuel cell, hydrogen gas serving as a fuel gas is supplied to an anode gas flow path that is formed between the anode electrode and the anode side separator, and air serving as an oxidant gas is supplied to a cathode gas flow path that is formed between the cathode electrode and the cathode side separator. As a result, hydrogen ions generated at the anode electrode as a result of a catalytic reaction permeate through the solid polymer electrolyte membrane and move to the cathode electrode, and at the cathode electrode, they electrochemically react with oxygen within the air, thereby causing electric power generation to be performed.

A fuel cell system is provided with a cooling device for cooling a fuel cell that generates heat as electricity is generated. For example, the fuel cell system disclosed in Japanese Unexamined Patent Application, First Publication No. 2010-67394 is mounted on a vehicle, and is provided with a radiator side flow path that supplies coolant to a radiator, a bypass flow path that bypasses the coolant that has cooled a fuel cell stack from the radiator, and a thermostat valve that makes the flow rate of the coolant flowing into the radiator side flow path greater when the coolant temperature is high, compared to that when the coolant temperature is low. The switching temperature of the thermostat valve is set to a fixed value on the basis of low altitude travelling.

The thermostat valve shuts off the bypass flow path and allows coolant to flow only into the radiator side flow path when the temperature of coolant becomes higher than the switching temperature. On the other hand, it shuts off the radiator side flow path and allows coolant to flow only into the bypass flow path when the temperature of coolant becomes lower than the switching temperature.

Furthermore, the fuel cell system disclosed in Japanese Unexamined Patent Application, First Publication No. 2010-67394 is provided with an electric heater that heats coolant, and a control device that controls the temperature of the coolant. The control device controls the electric heater based on coolant temperature and outside air temperature, and controls the temperature of coolant flowing into the fuel cell according to the outside air temperature.

For example, at a high altitude location where air pressure is low, the electric heater is operated to heat coolant that flows into the thermostat valve, and the thermostat valve is forced to operate to switch the coolant path to the radiator side flow path, to thereby perform coolant temperature control. Moreover, at a low altitude location where air pressure is high, the thermostat valve, in which the switching temperature is set on the basis of low altitude travelling, automatically switches between the radiator side path for allowing coolant to flow through the radiator, and the bypass flow path for bypassing the radiator, to thereby perform coolant temperature control.

According to Japanese Unexamined Patent Application, First Publication No. 2010-67394, it is claimed that: it is possible, at a high altitude location where air pressure is low, to prevent the membrane from drying out by controlling the temperature of coolant to be supplied to the fuel cell to a lower temperature; and it is possible, at a low altitude location where air pressure is high, to prevent excessive moisture by controlling the temperature of coolant to be supplied to the fuel cell to a higher temperature, and therefore, the wet state of the membrane of the fuel cell can always be maintained within an appropriate range regardless of the travelling environment of the vehicle.

Incidentally, in a fuel cell system, in some cases, oxygen and hydrogen may remain in the interior of the fuel cell after electric power generation is stopped. These remaining oxygen and hydrogen are known to oxidize the anode electrode and the cathode electrode and cause the fuel cell to deteriorate. Consequently, rapid cooling of a fuel cell after electric power generation is desired in order to suppress oxidation of the anode electrode and the cathode electrode.

SUMMARY

However, there is the following problem in the fuel cell system disclosed in Japanese Unexamined Patent Application, First Publication No. 2010-67394.

In the case of cooling the fuel cell after the fuel cell has stopped generating electric power, if the temperature of the coolant becomes lower than the switching temperature of the thermostat valve, the thermostat valve switches so that the coolant bypasses the radiator and flows through the bypass flow path. Therefore, the radiator cannot release the heat of the coolant, and the fuel cell cannot be rapidly cooled to the temperature that is lower than the switching temperature of the thermostat valve. As a result, there is a possibility that the fuel cell may be deteriorated in some cases.

In addition, in the fuel cell disclosed in Japanese Unexamined Patent Application, First Publication No. 2010-67394, in order to set the coolant temperature to a lower temperature by supplying coolant through the radiator side flow path, the coolant is heated so that the thermostat valve is switched. Therefore coolant cooling efficiency is poor.

Consequently, an aspect of the present invention has an object of providing a fuel cell system and a fuel cell system control method capable of rapidly cooling a fuel cell after the fuel cell has stopped generating electric power, and suppressing deterioration of the fuel cell.

An aspect of the present invention employs the following measures in order to solve the above problem.

(1) A fuel cell system according to an aspect of the present invention is a fuel cell system comprising: a fuel cell that generates electric power upon a reaction between a fuel gas and an oxidant gas; a radiator that releases heat of coolant that cools the fuel cell; a coolant pump that circulates the coolant; a temperature detection device that detects the temperature of the coolant; a coolant introduction path that introduces the coolant to the fuel cell; a coolant discharge path that discharges the coolant that has already flowed through the fuel cell; a radiator circulation path that supplies the coolant through the radiator and circulates it from the coolant discharge path to the coolant introduction path; a bypass circulation path that bypasses the radiator and circulates the coolant from the coolant discharge path to the coolant introduction path; a flow path switching valve that is provided at a connection part between the bypass circulation path and the coolant introduction path or between the bypass circulation path and the coolant discharge path, and that is set so as to supply the coolant to the bypass circulation path in a case where a temperature of the coolant becomes lower than or equal to a first temperature threshold value while the fuel cell is generating electric power; and a control portion that performs rapid cooling control of the fuel cell after the fuel cell has stopped generating electric power, wherein the control portion is provided with a flow path switching control device that controls the flow path switching valve in rapid cooling control for the fuel cell so as to supply the coolant to the radiator circulation path until the temperature of the coolant becomes a second temperature threshold value that is lower than the first temperature threshold value.

According the aspect of (1) above, after the fuel cell has stopped generating electric power, the flow path switching control device supplies coolant to the radiator circulation path until the temperature of the coolant becomes the second temperature threshold value, which is lower than the first temperature threshold value. Therefore heat release of the coolant can be effectively performed with the radiator. Consequently with rapid cooling control after the fuel cell has stopped generating electric power, the fuel cell can be rapidly cooled until the second temperature threshold value, which is lower than the first temperature threshold value, has been reached. As a result, deterioration of the fuel cell can be suppressed.

(2) In the aspect of (1) above, the flow path switching valve may be a thermostat valve; the thermostat valve may be provided with a heater that heats the thermostat valve; and the flow path switching control device may supply the coolant to the radiator circulation path until the temperature of the coolant becomes the second temperature threshold value, due to control of heat application to the thermostat valve performed by the heater after the fuel cell has stopped generating electric power.

In the case of (2) above, since the flow path switching valve is provided as a thermostat valve, the fuel cell system can be configured at a lower cost compared to the case of using a three-way valve for example. Moreover, by setting the switching temperature of the thermostat valve to a predetermined value, it is possible without performing special control, to switch automatically between the radiator circulation path and the bypass circulation path when the temperature of the coolant becomes the switching temperature. Consequently by providing the flow path switching valve as a thermostat valve, it is possible to switch easily between the radiator circulation path and the bypass circulation path.

Moreover, since there is provided a heater that heats the thermostat valve, it is possible, by controlling the temperature of the heater, to switch between the radiator circulation path and the bypass circulation path regardless of the temperature of the coolant. Consequently by heating the thermostat valve with the heater and bringing it to a temperature higher than the first temperature threshold value, the coolant that is treated artificially as being at a temperature higher than the first temperature threshold value can be supplied to the radiator circulation path even if the coolant temperature is actually lower than or equal to the first temperature threshold value. In addition, unlike the fuel cell system disclosed in Japanese Unexamined Patent Application, First Publication No. 2010-67394, the thermostat valve is heated and switched without applying heat to the coolant, and therefore the cooling efficiency of the coolant can be improved. Accordingly, after the fuel cell has stopped generating electric power, the coolant can be supplied to the radiator circulation path until the temperature of the coolant reaches the second temperature threshold value. Therefore the fuel cell can be rapidly cooled and deterioration of the fuel cell can be suppressed. As described above, by providing the flow path switching valve as a thermostat valve, and providing a heater that heats the thermostat valve, control can be simplified and deterioration of the fuel cell can be suppressed at the same time.

(3) In the aspect of (2) above, in the case where the rapid cooling control of the fuel cell has started and then a prescribed length of time has elapsed, the control portion may stop heat application to the thermostat valve performed by the heater, and may end the rapid cooling control of the fuel cell.

In the case of (3) above, the heat application to the thermostat valve is stopped when the prescribed length of time has elapsed. Therefore it is possible to suppress needless electric power consumption after the fuel cell has been sufficiently cooled. Moreover, since the coolant pump can be stopped by ending the rapid cooling control of the fuel cell, it is possible to suppress operating noise of the coolant pump and abnormal noise that occurs when coolant circulates. As a result, the quietness performance of the fuel cell system can be ensured. Therefore it is possible to suppress a sense of noise-caused discomfort felt by the user, and improve the merchantability of a product with the fuel cell system mounted therein.

Moreover, in a case where the prescribed length of time has elapsed even though the temperature of the coolant has not become lower than the second temperature threshold value after the rapid cooling control had started, a malfunction of a device that constitutes the fuel cell system may be assumed. Therefore, early detection of a malfunction of a device that constitutes the fuel cell system is possible.

(4) In the aspect of either one of (2) and (3) above, in the case where the temperature of the coolant at the time when electric power generation of the fuel cell is stopped is higher than the first temperature threshold value, the control portion may start applying heat to the thermostat valve using the heater and start circulating the coolant using the coolant pump, and in the case where the temperature of the coolant at the time when electric power generation of the fuel cell is lower than or equal to the first temperature threshold value, the control portion may start circulating the coolant using the coolant pump after a predetermined length of time has elapsed since the moment when the heater started applying heat to the thermostat valve.

In the case where the temperature of the coolant is lower than or equal to the first temperature threshold value, there is a possibility that the switching temperature of the thermostat valve may not have been reached and the thermostat valve may not have opened the radiator circulation path side valve. In the case where the coolant pump starts circulating the coolant in a state where the thermostat valve has not opened the radiator circulation path side valve, not only the coolant cannot be supplied through the radiator and heat release cannot be performed efficiently, but also electric power for driving the coolant pump is wastefully consumed. However, in the case of (4) above, when the temperature of the coolant is lower than or equal to the first temperature threshold value, the coolant pump starts circulating the coolant after a predetermined length of time has elapsed since the moment when heat application to the thermostat valve started. Therefore, the coolant can be circulated after the temperature of the thermostat valve has risen, and the thermostat valve has opened the radiator circulation path side valve. As a result, the coolant can be supplied through the radiator, and heat release can be performed efficiently without wastefully consuming electric power for driving the coolant pump.

(5) In the aspect of any one of (1) through (4) above, the rotation speed of the coolant pump may become higher as the temperature of the coolant becomes higher.

In the case of (5) above, when the temperature of the coolant is high, heat release of the coolant can be promoted by increasing the rotation speed of the coolant pump and thereby increasing the circulation flow rate of the coolant. Moreover, when the temperature of the coolant is low, electric power consumption of the coolant pump can be reduced by reducing the rotation speed of the coolant pump. Therefore, cooling of the fuel cell can be performed efficiently.

(6) In the aspect of any one of (1) through (5): there may be provided an outside air temperature detection device that detects an outside air temperature; the control portion may be provided with a determination device that determines whether or not to perform rapid cooling control of the fuel cell after the fuel cell has stopped generating electric power; and the determination device may not perform rapid cooling control of the fuel cell in the case where the outside air temperature is even lower than a predetermined outside air temperature that is lower than the first temperature threshold value, or in the case where the temperature of the coolant detected after the fuel cell has stopped generating electric power is even lower than a predetermined coolant temperature that is lower than the first temperature threshold value.

In the case of (6) above, it is possible to prevent rapid cooling control from being performed in those cases where rapid cooling of the fuel cell is not required such as a case where the outside air temperature is sufficiently lower in winter, and a case where the temperature of the coolant is sufficiently lower than the first temperature threshold value. Therefore, wasteful electric power consumption can be suppressed.

Moreover, since efficiency of electric power generation of a fuel cell drops at low temperatures in general, warm-up operation is required when activating a fuel cell system at low temperatures. However, according to the present invention, it is possible to prevent the coolant temperature from becoming any lower than is necessary. Therefore it is possible to suppress the warm-up operation time from being extended when the fuel cell system is stopped and is then reactivated. Consequently, the fuel cell system can be rapidly reactivated.

(7) In the aspect of any one of (1) through (6) above, there may be provided: an electrical storage device that accumulates electric power generated by the fuel cell and that supplies electric power required for starting electric power generation of the fuel cell; and a capacity detection portion that detects the capacity of the electrical storage device, and the rapid cooling control of the fuel cell may be ended before the capacity of the electrical storage device detected by the capacity detection portion becomes less than a predetermined capacity required for starting electric power generation of the fuel cell.

In the case of (7) above, the rapid cooling control of the fuel cell ends in the state where the capacity required for starting electric power generation of the fuel cell still remains in the electrical storage device. Therefore, deterioration of the fuel cell can be suppressed, and the fuel cell system can be reliably reactivated after it has been stopped.

(8) In the aspect of any one of (1) through (7) above, the control portion may be provided with a heat release amount calculation device that calculates a heat release amount of the coolant, and the rapid cooling control of the fuel cell may end in the case where the heat release amount of the coolant calculated by the heat release amount calculation device becomes greater than a predetermined heat release amount.

In the case of (8) above, the rapid cooling control of the fuel cell ends when the heat release amount of the coolant becomes greater than the predetermined heat release amount. Therefore it is possible to suppress wasteful electric power consumption after the fuel cell has been sufficiently cooled by the coolant. Moreover, in a case where the heat release amount of the coolant has become greater than the predetermined heat release amount even though the temperature of the coolant has not become lower than the second temperature threshold value after the rapid cooling control had started, a malfunction of a device that constitutes the fuel cell system may be assumed. Therefore, early detection of a malfunction of a device that constitutes the fuel cell system is possible.

(9) In the aspect of (1) above, the control portion may be provided with a malfunction detection device that detects a malfunction of a cooling system unit that is provided with, as cooling system devices, at least the radiator fan, the coolant pump, the temperature detection device, and the flow path switching valve; and the malfunction detection device may detect a malfunction of the cooling system unit in the case where, after the fuel cell has stopped generating electric power, the temperature of the coolant is lower than or equal to the first temperature threshold value and it is higher than the second temperature threshold value.

According the aspect of (9) above, after the fuel cell has stopped generating electric power, the flow path switching control device supplies coolant to the radiator circulation path until the temperature of the coolant becomes the second temperature threshold value, which is lower than the first temperature threshold value. Therefore heat release of the coolant can be effectively performed with the radiator. As a result, the fuel cell can be rapidly cooled after the fuel cell has stopped generating electric power, and therefore, deterioration of the fuel cell can be suppressed.

Moreover, since a malfunction of the cooling system unit can be detected every time the fuel cell stops generating electric power, a malfunction of the cooling system unit can be detected more frequently than in the case of detecting a malfunction of the cooling system unit only when the fuel cell starts generating electric power, for example, after it has been soaked for a long period of time. Therefore, a malfunction of the cooling system unit can be promptly detected. In addition, a malfunction of the cooling system unit is detected by supplying the coolant to the radiator circulation path until the temperature of the coolant reaches the second temperature threshold value, which is lower than the first temperature threshold value, and thereby comparing it with a malfunction determination threshold value when the decreasing rate of the coolant temperature is high. Therefore the difference between a predicted temperature and the detected temperature tends be great when the cooling system unit malfunctions. Consequently a malfunction of the cooling system unit can be detected reliably at a high level of precision.

(10) In the aspect of (9) above, the control portion may be provided with: a timing device that times the length of time elapsed since the moment when the fuel cell stopped generating electric power; a coolant temperature prediction device that predicts the temperature of the coolant based at least on the length of elapsed time timed by the timing device; and a temperature difference calculation device that compares a predicted temperature predicted by the coolant temperature prediction device, with a detected temperature detected by the temperature detection device, and that thereby calculates the temperature difference between the predicted temperature and the detected temperature, wherein the malfunction detection device may determine any one of the respective cooling system devices as being malfunctioning in the case where the temperature difference calculated by the temperature difference calculation device is greater than or equal to a preset malfunction determination threshold value.

In the case of (10) above, there is provided a coolant temperature prediction device, and a malfunction is determined after the fuel cell has stopped generating electric power by comparing the temperature difference between the predicted coolant temperature and the detected temperature, with the malfunction determination threshold value. Therefore, a malfunction of the cooling system unit can be precisely detected.

(11) In the aspect of either one of (9) and (10) above, the malfunction detection device may determine which cooling system device among the respective cooling system devices is malfunctioning, according to the temperature difference calculated by the temperature difference calculation device.

In the case of (11) above, a malfunctioning cooling system device can be easily identified. Therefore, maintenance operations can be promptly performed thereafter.

(12) A fuel cell system control method of an aspect according to the present invention is a method for controlling a fuel cell system comprising: a fuel cell that generates electric power upon a reaction between a fuel gas and an oxidant gas; a radiator that releases heat of coolant that cools the fuel cell; a coolant pump that circulates the coolant; a temperature detection device that detects the temperature of the coolant; a coolant introduction path that introduces the coolant to the fuel cell; a coolant discharge path that discharges the coolant that has already flowed through the fuel cell; a radiator circulation path that supplies the coolant through the radiator and circulates it from the coolant discharge path to the coolant introduction path; a bypass circulation path that bypasses the radiator and circulates the coolant from the coolant discharge path to the coolant introduction path; a flow path switching valve that is provided at a connection part between the bypass circulation path and the coolant introduction path or between the bypass circulation path and the coolant discharge path, and that is set so as to supply the coolant to the bypass circulation path in a case where a temperature of the coolant becomes lower than or equal to a first temperature threshold value while the fuel cell is generating electric power; and a control portion that performs rapid cooling control of the fuel cell after the fuel cell has stopped generating electric power, wherein there is included a step of controlling the flow path switching valve for, in the rapid cooling control of the fuel cell, supplying the coolant to the radiator circulation path until the temperature of the coolant detected by the temperature detection device has become a second temperature threshold value that is lower than the first temperature threshold value.

In the aspect of (12) above, there is included a step of controlling the flow path switching valve, for supplying the coolant to the radiator circulation path until the temperature of the coolant has become the second temperature threshold value, which is lower than the first temperature threshold value. Therefore it is possible to effectively perform heat release of the coolant using the radiator. Consequently with rapid cooling control after the fuel cell has stopped generating electric power, the fuel cell can be rapidly cooled until the second temperature threshold value, which is lower than the first temperature threshold value, has been reached. As a result, deterioration of the fuel cell can be suppressed.

(13) In the aspect of (12) above, there may be included a step of detecting a malfunction of the cooling system unit that is provided with, as cooling system devices, at least the radiator fan, the coolant pump, the temperature detection device, and the flow path switching valve, and in the step of detecting a malfunction of the cooling system unit, a malfunction of the cooling system unit may be detected if the temperature of the coolant is less than or equal to the first temperature threshold value and is greater than the second temperature threshold value, after the fuel cell has stopped generating electric power.

In the aspect of (13) above, there is included a step of supplying the coolant to the radiator circulation path until the temperature of the coolant has become the second temperature threshold value, which is lower than the first temperature threshold value. Therefore it is possible to effectively perform heat release of the coolant using the radiator. As a result, the fuel cell can be rapidly cooled after the fuel cell has stopped generating electric power, and therefore, deterioration of the fuel cell can be suppressed.

Moreover, since there is provided a step of detecting a malfunction of the cooling system unit after the fuel cell stops generating electric power, a malfunction of the cooling system unit can be detected more frequently than in the case of detecting a malfunction of the cooling system unit only when the fuel cell starts generating electric power, for example, after it has been soaked for a long period of time. Therefore, a malfunction of the cooling system unit can be promptly detected. In addition, there is provided a step of supplying coolant to the radiator circulation path until the temperature of the coolant reaches the second temperature threshold value, which is lower than the first temperature threshold value, and a malfunction of the cooling system unit is detected by comparing it with a malfunction determination threshold value when the decreasing rate of the coolant temperature is high. Therefore, the difference between a predicted temperature and the detected temperature tends be great when the cooling system unit malfunctions. Consequently a malfunction of the cooling system unit can be detected reliably at a high level of precision.

As described above, according the aspect of the present invention, after the fuel cell has stopped generating electric power, the flow path switching control device supplies coolant to the radiator circulation path until the temperature of the coolant becomes the second temperature threshold value, which is lower than the first temperature threshold value. Therefore heat release of the coolant can be effectively performed with the radiator. Consequently with rapid cooling control after the fuel cell has stopped generating electric power, the fuel cell can be rapidly cooled until the second temperature threshold value, which is lower than the first temperature threshold value, has been reached. As a result, deterioration of the fuel cell can be suppressed.

Moreover, since a malfunction of the cooling system unit can be detected every time the fuel cell stops generating electric power, a malfunction of the cooling system unit can be detected more frequently than in the case of detecting a malfunction of the cooling system unit only when the fuel cell starts generating electric power, for example, after it has been soaked for a long period of time. Therefore, a malfunction of the cooling system unit can be promptly detected. In addition, a malfunction of the cooling system unit is detected by supplying the coolant to the radiator circulation path until the temperature of the coolant reaches the second temperature threshold value, which is lower than the first temperature threshold value, and thereby comparing it with a malfunction determination threshold value when the decreasing rate of the coolant temperature is high. Therefore the difference between a predicted temperature and the detected temperature tends be great when the cooling system unit malfunctions. Consequently a malfunction of the cooling system unit can be detected reliably at a high level of precision.

DESCRIPTION OF EMBODIMENTS

First Embodiment

Hereunder, a first embodiment of the present invention is described, with reference to the drawings. In the following description, a fuel cell system to be mounted on a vehicle is taken as an example.

Figure 1:
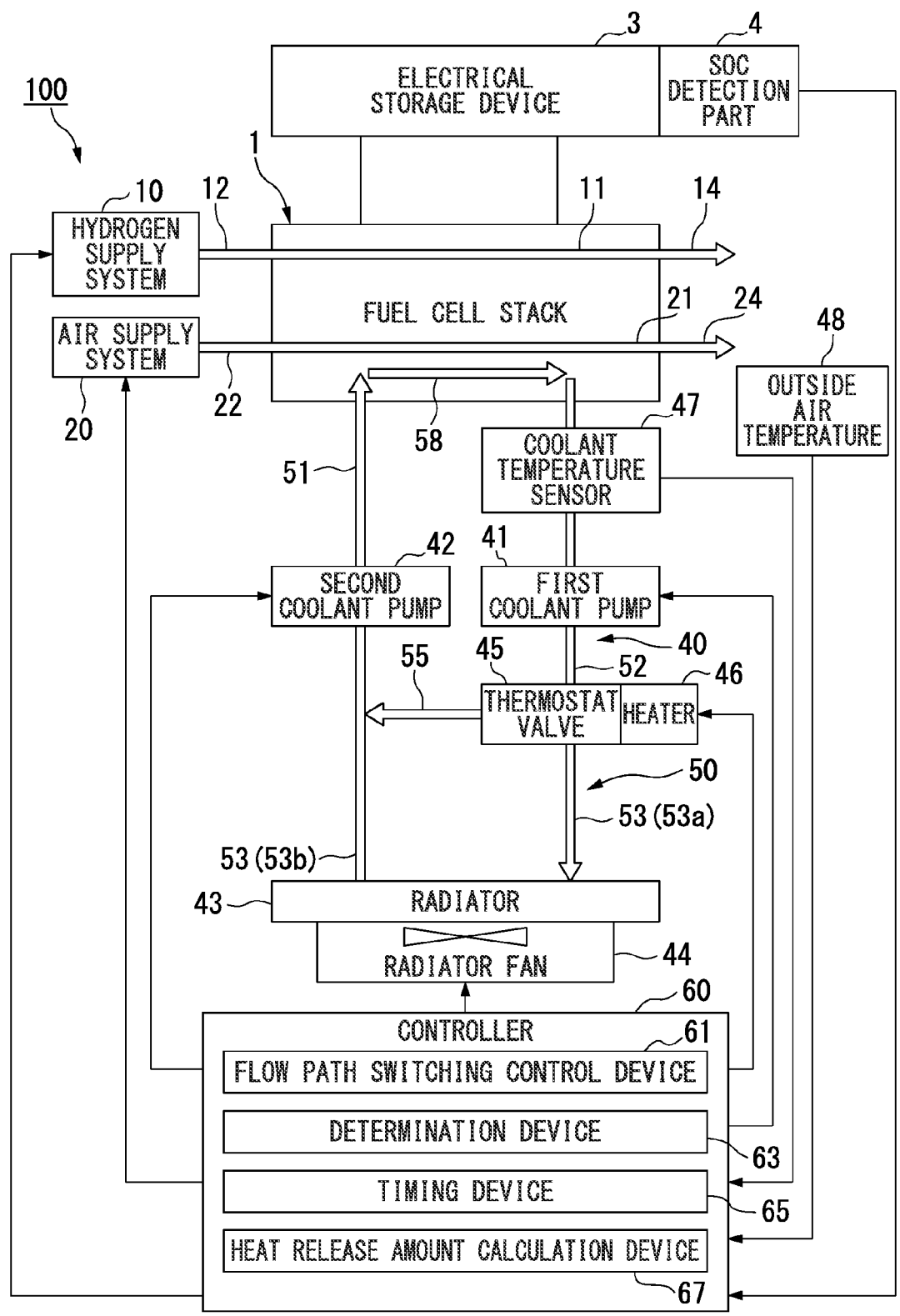
FIG. 1 is a block diagram showing a schematic configuration of a fuel cell system of a first embodiment according to the present invention.

FIG. 1 is a block diagram showing a schematic configuration of a fuel cell system 100.

The fuel cell system 100 is provided with a fuel cell stack (hereunder, referred to simply as "fuel cell") 1 that generates electric power upon a reaction between a fuel gas and an oxidant gas. The fuel cell 1 is one where a number of unit fuel cells (hereunder, referred to as "unit cells") are laminated and connected electrically in series. The unit cell is of a sandwich structure in which separators are arranged on the both sides of a membrane electrode structure. To describe in detail, the membrane electrode structure is configured such that an anode electrode and a cathode electrode are arranged on both sides of a solid polymer electrolyte membrane (electrolyte membrane) that is composed, for example, of a fluorine-based electrolyte material. An anode side separator is arranged facing the anode electrode of the membrane electrode structure, and an anode gas flow path 11 is formed therebetween. Moreover, a cathode side separator is arranged facing the cathode electrode of the membrane electrode structure, and a cathode gas flow path 21 is formed therebetween.

In this fuel cell 1, a fuel gas such as hydrogen gas is supplied as an anode gas to the anode gas flow path 11, and an oxidant gas such as air that contains oxygen is supplied as a cathode gas to the cathode gas flow path 21. As a result, hydrogen ions produced at the anode electrode by a catalytic reaction permeate through the solid polymer electrolyte membrane and move to the cathode electrode. These hydrogen ions electrochemically react with oxygen at the cathode electrode to generate electric power, and water is produced on the cathode side as a result of the electric power generation.

To the entry side of the anode gas flow path 11 of the fuel cell 1, there is connected an anode gas supply path 12. To the upstream side of the anode gas supply path 12, there is connected a hydrogen supply system 10. In the hydrogen supply system 10 there are provided a hydrogen tank (not shown in figure), an electromagnetic cutoff valve (not shown in figure) that cuts off supply of fuel gas, a pressure reducing valve (not shown in figure) that reduces pressure of the fuel gas according to the pressure of the oxidant gas, and an ejector (not shown in figure) that causes anode off-gas to flow into the anode gas supply path 12.

Moreover, on the exit side of the anode gas flow path 11 of the fuel cell 1, there is provided an anode circulation path 14. The anode circulation path 14 is connected to the ejector.

The fuel gas supplied from the hydrogen tank of the hydrogen supply system 10 travels through the anode gas supply path 12 and is supplied to the anode gas flow path 11 of the fuel cell 1. Anode off-gas circulates in a manner such that it travels through the anode circulation path 14, is sucked into the ejector, flows together with the fuel gas supplied from the hydrogen tank, and is supplied to the fuel cell 1 again.

An anode off-gas discharge pipe (not shown in figure) branches from the anode circulation path 14 via an electromagnetically driven purge valve (not shown in figure). In those cases where the concentration of impurities (such as moisture, air, and nitrogen) within anode off-gas that circulates through the fuel cell 1 becomes high, the purge valve periodically opens according to the operating state of the fuel cell 1, and the anode off-gas is discharged to the anode off-gas discharge pipe. The anode off-gas discharge pipe is connected to a diluter (not shown in figure). The diluter dilutes unreacted fuel gas contained in the anode off-gas with cathode off-gas, and discharges it to the outside.

To the entry side of the cathode gas flow path 21 of the fuel cell 1, there is connected a cathode gas supply path 22. To the upstream side of the cathode gas supply path 22, there is connected an air supply system 20. In the air supply system 20 there are provided a compressor (not shown in figure) that supplies oxidant gas, and a humidifier (not shown in figure) that humidifies the oxidant gas using the cathode off-gas.

Moreover, on the exit side of the cathode gas flow path 21, there is provided a cathode off-gas discharge pipe 24. The cathode off-gas discharge pipe 24 passes through the humidifier, and is connected to a diluter (not shown in figure) via a back pressure valve (not shown in figure).

The air that has been pressurized by the compressor of the air supply system 20 travels through the cathode gas supply path 22 to be supplied to the cathode gas flow path 21 of the fuel cell 1. Oxygen within this air serving as an oxidant is supplied for electric power generation, and then it is discharged as cathode off-gas from the fuel cell 1.

The fuel cell 1 is electrically connected to the electrical storage device 3 via a DC/DC converter or the like (not shown in figure), and electric power generated in the fuel cell 1 can be stored in the electrical storage device 3.

The fuel cell 1 and the electrical storage device 3 are connected to an external load (not shown in figure) such as a motor of a vehicle, so that they can supply electric power thereto. The vehicle uses electric power supplied from the fuel cell 1 and the electrical storage device 3 to drive the motor and travel. In the case where output of the fuel cell 1 is insufficient with respect to the output requested by the vehicle, for example, where the vehicle is accelerating or it is activating at low temperatures, the electrical storage device 3 supplies stored electric power and compensates output shortage of the fuel cell 1.

Moreover, the electrical storage device 3 is provided with a SOC detection portion 4 (capacity detection portion) that detects the capacity (state of charge: SOC) of the electrical storage device 3. The SOC detection portion 4 outputs electric signals corresponding to the SOC of the electrical storage device 3 to a controller 60 described later.

(Cooling System Unit)

The fuel cell system 100 is provided with a cooling system unit 40 that cools the fuel cell 1 by means of heat exchange with coolant such as cooling water.

The cooling system unit 40 is provided with: a coolant circulation path 50 through which coolant circulates; a radiator 43 that releases heat of the coolant; a radiator fan that sends air to the radiator 43; a first coolant pump 41 and a second coolant pump 42 that circulate the coolant; a coolant temperature sensor 47 (temperature detection device) that detects the temperature of the coolant circulating through the coolant circulation path 50; a thermostat valve 45 (flow path switching valve) that switches flow paths of the coolant; and a heater 46 that applies heat to the thermostat valve 45. Hereunder, among the respective devices that constitute the cooling system unit 40, the radiator fan 44, the first coolant pump 41, the second coolant pump 42, the coolant temperature sensor 47, the thermostat valve 45, and the heater 46 may be collectively referred to as cooling system devices.

The coolant circulation path 50 is connected to a coolant communication path 58 formed within the fuel cell 1, and is formed with a coolant introduction path 51, a coolant discharge path 52, a radiator circulation path 53, and a bypass circulation path 55, to allow the coolant to circulate between the inside and the outside of the fuel cell 1.

The coolant introduction path 51 is a flow path for introducing the coolant into the fuel cell 1. The coolant introduction path 51 is connected to the coolant circulation direction upstream side in the coolant communication path 58 of the fuel cell 1.

The coolant discharge path 52 is a flow path for discharging the coolant that has been introduced into and has traveled through the fuel cell 1, to the outside of the fuel cell 1. The coolant discharge path 52 is connected to the coolant circulation direction downstream side in the coolant communication path 58 of the fuel cell 1.

The radiator circulation path 53 is a flow path for allowing the coolant to travel through the radiator 43 and circulate it from the coolant discharge path 52 to the coolant introduction path 51. The radiator circulation path 53 is formed with a radiator introduction path 53a and a radiator discharge path 53b.

The radiator introduction path 53a is a flow path for introducing the coolant to the radiator 43. The upstream side thereof is connected to the coolant discharge path 52 and the downstream side thereof is connected to the radiator 43.

The radiator discharge path 53b is a flow path for discharging the coolant from the radiator 43. The upstream side thereof is connected to the radiator 43 and the downstream side thereof is connected to the coolant introduction path 51.

The bypass circulation path 55 is a flow path for allowing the coolant to bypass the radiator 43 and circulate it from the coolant discharge path 52 to the coolant introduction path 51. The bypass circulation path 55 is formed so as to connect the upstream side of the coolant introduction path 51 and the downstream side of the coolant discharge path 52. The coolant travels through the bypass circulation path 55, thereby bypassing the radiator 43 and circulating through the coolant circulation path 50. The coolant circulation path 50 can be switched between the radiator circulation path 53 and the bypass circulation path 55 by the thermostat valve 45 described later.

On the radiator circulation path 53 there is arranged the radiator 43. The radiator 43 performs heat exchange between the coolant circulating within the radiator 43 and the outside air at the outer periphery of the radiator 43 to release the heat from the coolant.

The radiator fan 44 is driven at a predetermined driving Duty based on commands from the controller 60 (control portion) described later. The radiator fan 44 supplies cooling air to the radiator 43, and promotes heat exchange between the coolant circulating within the radiator 43 and the outside air. Here, driving Duty refers to the ratio of conduction ON time to the driving time of the radiator fan 44. Therefore, the rotation speed of the radiator fan 44 becomes higher as the driving Duty becomes higher.

On the coolant discharge path 52 there is arranged the first coolant pump 41. Moreover, on the coolant introduction path 51 there is arranged the second coolant pump 42. The first coolant pump 41 and the second coolant pump 42 are driven at a predetermined driving Duty (rotation speed) based on commands from the controller 60 described later, and they pressure-feed and circulate the coolant within the coolant circulation path 50.

On the coolant discharge path 52 there is arranged the coolant temperature sensor 47. The coolant temperature sensor 47 detects the temperature of the coolant that has been discharged from the fuel cell 1. The coolant temperature sensor 47 is arranged in close proximity of the fuel cell 1, on the coolant discharge path 52. Therefore, the temperature of the coolant detected by the coolant temperature sensor 47 becomes substantially the same as the internal temperature of the fuel cell 1.

(Thermostat Valve)

At the connection part between the bypass circulation path 55, the coolant discharge path 52, and the radiator circulation path 53 (radiator introduction path 53a), there is arranged the thermostat valve 45. The thermostat valve 45 is configured in a manner such that it uses thermal expansion and thermal contraction of, for example, enclosed wax so that the valve automatically changes its opening. The thermostat valve 45 opens the valve of either the bypass circulation path 55 side or the radiator circulation path 53 side and closes the valve of the other side, to thereby switch the flow path of the coolant between the bypass circulation path 55 and the radiator circulation path 53.

The switching temperature at which the thermostat valve 45 switches is set to a predetermined first temperature threshold value TL1 (for example, 65° C.).

Specifically, while the fuel cell 1 is generating electric power, the thermostat valve 45 switches the flow path of the coolant in the following manner.

When the temperature of the coolant is higher than the first temperature threshold value TL1, the thermostat valve 45 opens the valve of the radiator circulation path 53 side, and closes the valve of the bypass circulation path 55 side. As a result, the coolant circulates within the radiator 43, and can release heat after it has absorbed heat from the fuel cell 1. Therefore, the fuel cell 1 can be rapidly cooled.

On the other hand, when the temperature of the coolant is lower than or equal to the first temperature threshold value TL1, the thermostat valve 45 opens the valve of the bypass circulation path 55 side, and closes the valve of the radiator circulation path 53 side. As a result, the coolant can bypass the radiator 43, which causes significant pressure loss, and therefore, it can efficiently circulate through the coolant circulation path 50. Moreover, since temperature drop in the coolant can be suppressed by bypassing the radiator 43, a warm-up operation can be efficiently performed, for example, immediately after the fuel cell 1 starts generating electric power.

The thermostat valve 45 is provided with a heater 46 that heats the thermostat valve 45. The heater 46 is fixed, for example, on a side of the thermostat valve 45. The heater 46 is a so-called electric heater composed, for example, of an electric resistor, and it generates heat when energized. As described later, in the rapid cooling control of the fuel cell 1 that is performed after the fuel cell 1 has stopped generating electric power, the heater 46 applies heat to the thermostat valve 45 based on commands from the controller 60. As a result, even when the temperature of the coolant is lower than or equal to the first temperature threshold value TL1, the thermostat valve 45 can automatically switch the flow path of the coolant due to the heat from the heater 46, and the coolant can be supplied to the radiator circulation path 53.

(Controller)

The fuel cell system 100 is provided with the controller 60. The controller 60 is connected electrically to the hydrogen supply system 10, the air supply system 20, the SOC detection portion 4 that detects the capacity of the electrical storage device 3, the outside air temperature sensor 48 (outside air temperature detection device) that detects the temperature of outside air, and the respective cooling system devices that constitute the cooling system unit 40. The controller 60 performs stop control of the fuel cell 1 described later by controlling the respective cooling system devices. The controller 60 is provided with a flow path switching control device 61, a determination device 63, a timing device 65, and a heat release amount calculation device 67.

The flow path switching control device 61 controls heat application to the thermostat valve 45 performed by the heater 46 so that the coolant is supplied to the radiator circulation path 53 until the temperature of the coolant becomes a second temperature threshold value TL2 (for example, 50° C.) that is lower than the first temperature threshold value TL1, after the fuel cell 1 has stopped generating electric power. The second temperature threshold value TL2 is a temperature target value of the coolant in the rapid cooling control of the fuel cell 1 described later.

After the fuel cell 1 has stopped generating electric power, the flow path switching control device 61 energizes the heater 46 to apply heat to the thermostat valve 45, opens the radiator circulation path 53 side valve of the thermostat valve 45, and closes the bypass circulation path 55 side valve. As a result, the coolant circulates within the radiator 43 and releases heat after it has absorbed heat from the fuel cell 1, and the temperature of the coolant is rapidly reduced. The flow path switching control device 61 energizes the heater 46 until the temperature of the coolant becomes the second temperature threshold value TL2. As a result, the coolant flows through the radiator circulation path 53 until the temperature of the coolant becomes the second temperature threshold value TL2 after the fuel cell 1 has stopped generating electric power, and therefore, the radiator 43 can effectively release heat of the coolant.

The determination device 63 determines whether or not rapid cooling control for the fuel cell is to be performed after the fuel cell 1 has stopped generating electric power. The determination device 63 is described later.

The timing device 65 times the length of time elapsed since the moment when the rapid cooling control of the fuel cell 1 started.

The heat release amount calculation device 67 calculates the amount of heat released from the coolant in the rapid cooling control. The method of calculating a heat release amount is described later.

(Fuel Cell Stop Control Method)

Next, a stop control method of the fuel cell 1 according to the embodiment is described.

Figure 2:
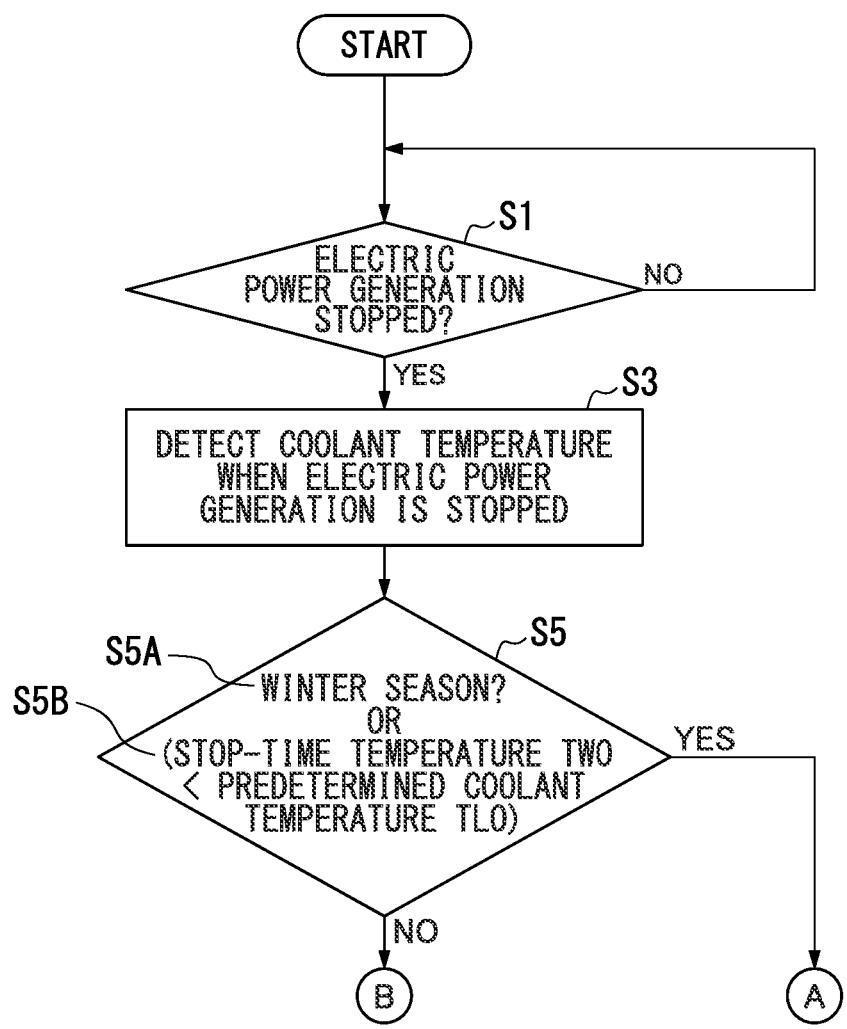
FIG. 2 is a flow chart of a stop control method of a fuel cell of the first embodiment according to the present invention.
Figure 3:
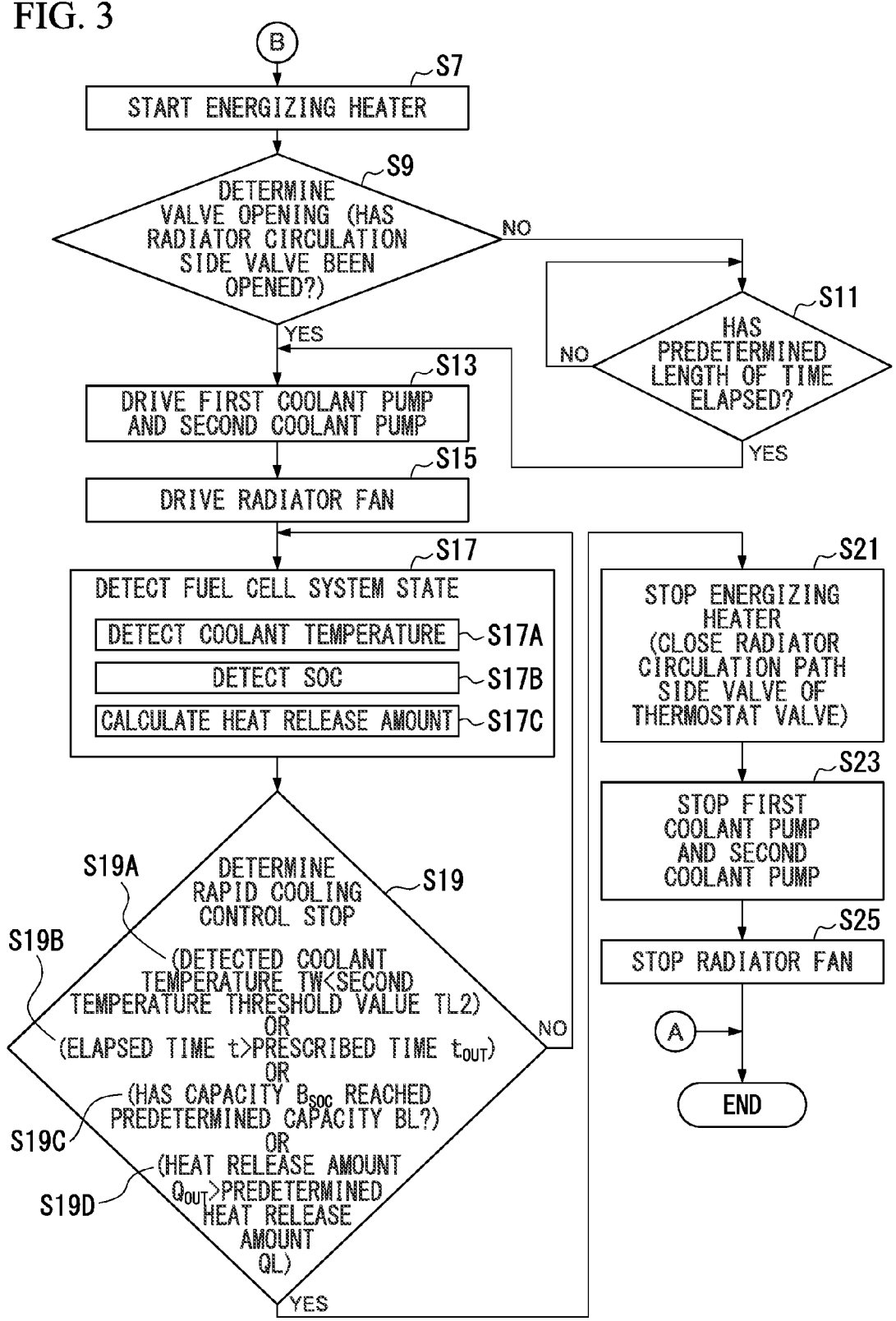
FIG. 3 is a flow chart of a stop control method of the fuel cell of the first embodiment according to the present invention.

FIG. 2 and FIG. 3 are flow charts of the stop control method of the fuel cell 1 (refer to FIG. 1) according to the embodiment. Hereunder, each step (step S1 through step S25) of the stop control method of the fuel cell 1 is described, with reference to FIG. 2 and FIG. 3. FIG. 2 shows the flow chart (step S1 to step S5) of the stop control method of the fuel cell 1 before rapid cooling control is performed. Moreover, FIG. 3 shows the flow chart (step S7 to step S25) of the rapid cooling control of the fuel cell 1, of the stop control method of the fuel cell 1. Refer to FIG. 1 for reference symbols of the respective components in the description of the flow charts of FIG. 2 and FIG. 3, and those in the description of the graphs of FIG. 4 and thereafter.

As shown in FIG. 2, first, in step S1, it is determined whether or not the fuel cell 1 is in the electric power generation stop state. To determine whether or not the fuel cell 1 is in the electric power generation state, for example, the controller 60 reads the state of an ignition switch (not shown in figure). Specifically, if the ignition switch is in the OFF state, "YES" is determined in step S1 where the fuel cell 1 is treated as being in the electric power generation stop state, and the process proceeds to the next step S3. On the other hand, if the ignition switch is in the ON state, "NO" is determined in step S1 where the fuel cell 1 is treated as being in the electric power generating state, and the state of the ignition switch is read again.

In step S3, immediately after the fuel cell 1 has been determined as being in the electric power generation stop state in step S1, the coolant temperature sensor 47 detects the coolant temperature at the time when the fuel cell 1 has stopped generating electric power (hereunder, referred to as "stop time temperature TW0"), and outputs it to the controller 60.

In step S5, it is determined whether or not rapid cooling control is performed. Specifically, in step S5, whether or not it is a winter season is determined (hereunder, referred to as "winter season determination step S5A") and the temperature of the coolant based on the stop time temperature TW0 is determined (hereunder, referred to as "stop time temperature determination step S5B"), to thereby determine whether or not the determination device 63 of the controller 60 performs the rapid cooling control.

In the winter season determination step S5A, for example, if the outside air temperature Tout detected by the outside air temperature sensor 48 is even lower than a predetermined outside air temperature (for example, 5° C.) that is lower than the first temperature threshold value TL1, it is determined as being a winter season. If it is a winter season, the outside air temperature Tout is sufficiently low, and therefore, the temperature of the coolant is considered to drop rapidly without performing the rapid cooling control. Therefore, there is no need for performing the rapid cooling control, and "YES" is determined in step S5.

In the stop time temperature determination step S5B, whether or not the temperature of the coolant is sufficiently low is determined by comparing the stop time temperature TW0 and the predetermined coolant temperature TL0. Here, the predetermined coolant temperature TL0 is a temperature lower than the first temperature threshold value TL1, and it is set to the same temperature (for example, 50° C.) as the second temperature threshold value TL2 for example.

If the stop time temperature TW0 is lower than the predetermined coolant temperature TL0, the temperature of the coolant is sufficiently low and there is no need for performing the rapid cooling control. Accordingly, "YES" is determined in step S5.

That is to say, in step S5, in the case where winter season is determined in the winter season determination step S5A or in the case where the stop time temperature TW0 is determined as being lower than the predetermined coolant temperature TL0 in the stop time temperature determination step S5B, "YES" is determined in step S5, and the process ends the stop control of the fuel cell 1 without proceeding to step S7 and subsequent steps thereafter (that is to say, without performing the rapid cooling control) (refer to FIG. 3).

On the other hand, in step S5, in the case where winter season is not determined in the winter season determination step S5A and the stop time temperature TW0 is determined as being higher than or equal to the predetermined coolant temperature TL0 in the stop time temperature determination step S5B, "NO" is determined in step S5, and the process proceeds to step S7 and subsequent steps thereafter to perform the rapid cooling control (refer to FIG. 3).

In this manner, by determining in step S5 whether or not the rapid cooling control is performed, it is possible to prevent the rapid cooling control from being performed when the rapid cooling control of the fuel cell 1 is not required. Therefore, wasteful electric power consumption can be suppressed.

Moreover, since efficiency of electric power generation of a fuel cell 1 drops at low temperatures in general, a warm-up operation is required when activating a fuel cell system 100 at low temperatures. However, as described above, it is possible, in step S5, to prevent the coolant temperature from becoming any lower than is necessary. Therefore it is possible to suppress the warm-up operation time from being extended when the fuel cell system is stopped and is then reactivated. Consequently the fuel cell system 100 can be rapidly reactivated.

(Fuel Cell Rapid Cooling Control Method)

Hereunder, a rapid cooling control method of the fuel cell 1 (step S7 and subsequent steps thereafter) is described.

As shown in FIG. 3, in step S7, the flow path switching control device 61 of the controller 60 starts energizing the heater 46 to apply heat to the thermostat valve 45.

In step S9, it is determined whether or not the radiator circulation path 53 side valve is opened and the bypass circulation path 55 side valve is closed (hereunder, referred to as "thermostat valve 45 valve opening determination step S9"). The thermostat valve 45 opening determination step S9 is performed in a manner such that the controller 60 reads the coolant temperature detected by the coolant temperature sensor 47.

For example, in the case where the stop time temperature TW0 of the coolant is higher than the first temperature threshold value TL1, which is the switching temperature of the thermostat valve 45, it is considered that the thermostat valve 45 had already reached the switching temperature before the heater 46 started being energized (step S7) and it has opened the radiator circulation path 53 side valve. Therefore, "YES" is determined in the thermostat valve 45 valve opening determination step S9, and the process proceeds to step S13.

On the other hand, in the case where the stop time temperature TW0 of the coolant is lower than or equal to the first temperature threshold value TL1, which is the switching temperature of the thermostat valve 45, there is a possibility that the thermostat valve 45 has not yet reached the switching temperature, and it has not opened the radiator circulation path 53 side valve. Therefore, "NO" is determined in the thermostat valve 45 valve opening determination step S9, and the process proceeds to step S13 after a predetermined length of time has elapsed therefrom (step S11). Here, the predetermined length of time in step S11 refers to a length of time during which, for example, the thermostat valve 45 is heated by the heater 46 (step S7) having reached the switching temperature, and the radiator circulation path 53 side valve is assumed to be open. The predetermined times are mapped within the controller 60 so as to correspond to the stop time temperature TW0 detected in step S3 for example.

In this manner, by providing the thermostat valve 45 valve opening determination step S9, it is possible for the process to reliably proceed to the next steps (step S13 and subsequent steps thereafter) after the radiator circulation path 53 side valve has been opened. Therefore it is possible to supply coolant through the radiator 43, and heat release can be efficiently performed by driving the first coolant pump 41 and the second coolant pump 42 without wastefully consuming electric power in step S13.

Figure 4:
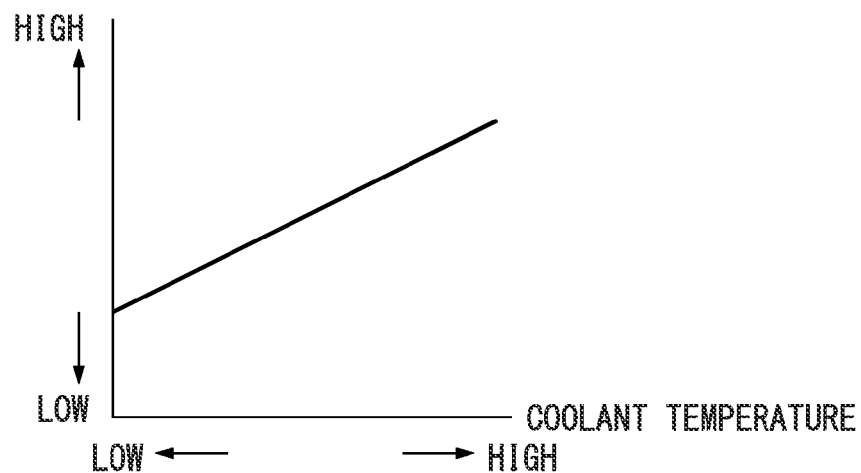
FIG. 4 is a graph where the vertical axis represents the rotation speed of a first coolant pump (second coolant pump), and the horizontal axis represents coolant temperature.

FIG. 4 is a graph where the vertical axis represents the rotation speed of the first coolant pump 41 (second coolant pump 42), and the horizontal axis represents coolant temperatures.

In step 13, the first coolant pump 41 and the second coolant pump 42 are driven. The coolant within the coolant circulation path 50 is pressure-fed by the first coolant pump 41 and the second coolant pump 42, and flows through the radiator 43 to circulate between the inside and the outside of the fuel cell 1.

As shown in FIG. 4, the rotation speed of the first coolant pump 41 and the second coolant pump 42 corresponds to the coolant temperature detected by the coolant temperature sensor 47, and it is set so that the rotation speed of the first coolant pump 41 and the second coolant pump 42 becomes higher as the coolant temperature becomes higher.

As a result, when the temperature of the coolant is high, heat release of the coolant can be promoted by increasing the rotation speed of the first coolant pump 41 and the second coolant pump 42 and thereby increasing the circulation flow rate of the coolant. Moreover, when the coolant temperature is low, electric power consumption of the first coolant pump 41 and the second coolant pump 42 can be reduced by lowering the rotation speed of the first coolant pump 41 and the second coolant pump 42. Therefore, cooling of the fuel cell 1 can be performed efficiently.

Figure 5:
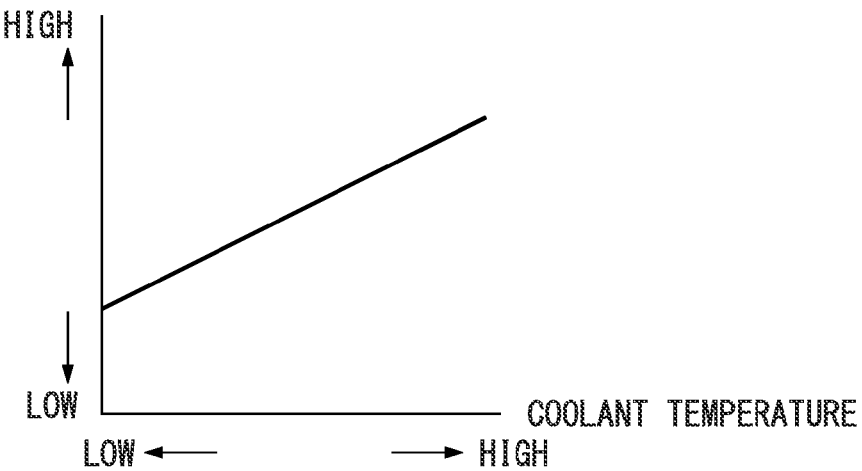
FIG. 5 is a graph where the vertical axis represents the rotation speed of a radiator fan, and the horizontal axis represents coolant temperature.

FIG. 5 is a graph where the vertical axis represents the rotation speed of a radiator fan 44, and the horizontal axis represents coolant temperature. In step S15, the radiator fan 44 is driven. The radiator fan 44 supplies cooling air to the radiator 43. As a result, when the coolant circulates within the radiator 43 after having absorbed heat from the fuel cell 1, heat exchange with the air outside the radiator 43 is promoted and heat from the radiator 43 can be efficiently released. Therefore, the fuel cell 1 can be rapidly cooled.

As shown in FIG. 5, the rotation speed of the radiator fan 44 corresponds to the coolant temperature detected by the coolant temperature sensor 47, and it is set so that the rotation speed of the radiator fan 44 becomes higher as the coolant temperature becomes higher. As a result, the amount of air sent to the radiator 43 increases as the coolant temperature becomes higher. Therefore heat exchange between the coolant circulating within the radiator 43 and the air outside the radiator 43 is promoted and the fuel cell 1 can be rapidly cooled. Moreover, when the coolant temperature is low, it is possible to reduce electric power consumption of the radiator fan 44. Therefore, cooling of the fuel cell 1 can be performed efficiently.

As shown in FIG. 3, in step S17, coolant temperature detection step S17A, SOC detection step S17B, and heat release amount calculation step S17C are performed to thereby detect the state of the fuel cell system 100.

In coolant temperature detection step S17A, the coolant temperature sensor 47 detects the temperature of the coolant (hereunder, referred to as "detected coolant temperature TW"), and outputs it to the controller 60.

In SOC detection step S17B, the SOC detection portion 4 detects the SOC (hereunder, referred to as "capacity Bsoc") of the electrical storage device 3, and outputs it to the controller 60. During the rapid cooling control, the capacity Bsoc of the electrical storage device 3 gradually decreases due to the electric power consumption of the heater 46, the first coolant pump 41, the second coolant pump 42, and the radiator fan 44.

The heat release amount calculation step S17C is performed based on the following calculation formula. That is to say, when the heat release amount of the coolant at the time of performing the rapid cooling control is taken as Qout, the weight of the coolant circulating through the coolant circulation path 50 of the cooling system unit 40 is taken as m, and the specific heat of the coolant is taken as C, the heat release amount is calculated as follows:

$$Q\text{out} = m \cdot C(TW0 - TW) \tag{1}$$

The detected coolant temperature TW detected in the coolant temperature detection step S17A, the capacity Bsoc of the electrical storage device 3 detected in the SOC detection step S17B, and the heat release amount Qout calculated in the heat release amount calculation step S17C are output to the controller 60.

In step S19, based on the respective determining factors of detected coolant temperature determination step S19A, rapid cooling control time determination step S19B, electrical storage device capacity determination step S19C, and heat release amount determination step S19D, it is determined whether or not the rapid cooling control is stopped (hereunder, referred to as "rapid cooling control stop determination step S19"). Hereunder, details of the respective determining factors are described.

In the detected coolant temperature determination step S19A, it is determined whether or not the detected coolant temperature TW is lower than the second temperature threshold value TL2. If the detected coolant temperature TW is lower than the second temperature threshold value TL2, "YES" is determined in the detected coolant temperature determination step S19A, and "YES" is determined in the rapid cooling control stop determination step S19, and the process proceeds to step S21 and subsequent steps thereafter to perform an operation of stopping the rapid cooling control.

In the rapid cooling control time determination step S19B, it is determined whether or not the elapsed time t from the start of the rapid cooling control, which has been timed by the timing device 65, has exceeded the prescribed length of time tout. Here, the prescribed length of time tout is a length of time during which the detected coolant temperature TW is assumed to become lower than the second temperature threshold value TL2 if the rapid cooling control is normally performed, for example. In the case where the length of time t elapsed since the start of the rapid cooling control has exceeded the prescribed length of time tout, it is assumed either that the detected coolant temperature TW has become lower than the second temperature threshold value TL2 or that any one of the devices that constitutes the fuel cell system 100 is malfunctioning. Accordingly, "YES" is determined in the rapid cooling control time determination step S19B, and "YES" is determined in the rapid cooling control stop determination step S19, and the process proceeds to step S21 and subsequent steps thereafter to perform an operation of stopping the rapid cooling control.

By providing the rapid cooling control time determination step S19B, heat application to the thermostat valve 45 is stopped by the stop operation of the rapid cooling control as described later (step S21) if the prescribed length of time tout has elapsed. As a result, wasteful electric power consumption can be suppressed after the fuel cell 1 has been sufficiently cooled. Furthermore, since the first coolant pump 41, the second coolant pump 42, and the radiator fan 44 are stopped (step S23 and step S25), it is possible to suppress operating noise of the first coolant pump 41, the second coolant pump 42, and the radiator fan 44, and abnormal noise that occurs when the coolant circulates. As a result, the quietness performance of the fuel cell system 100 can be ensured. Therefore it is possible to suppress a sense of noise-caused discomfort felt by the user, and improve the merchantability of the vehicle with the fuel cell system 100 mounted therein.

Moreover, in a case where the prescribed length of time tout has elapsed even though the temperature of the coolant has not become lower than the second temperature threshold value TL2, a malfunction of some device that constitutes the fuel cell system 100 may be assumed. Therefore, early detection of a malfunction of a device that constitutes the fuel cell system 100 is possible.

In the electrical storage device capacity determination step S19C, it is determined whether or not the capacity Bsoc of the electrical storage device 3, which gradually decreases during the rapid cooling control, has reached a predetermined capacity BL. Here, the predetermined capacity BL is a capacity of the electrical storage device 3 that corresponds to the electric power required for the fuel cell 1 to start generating electric power.

In order to enable the fuel cell 1 to generate electric power again after the fuel cell 1 has stopped generating electric power (that is to say, in order to reactivate it), it is necessary to ensure that the capacity Bsoc of the electrical storage device 3 is at the predetermined capacity BL or higher, and it is necessary to stop rapid cooling control before the capacity Bsoc of the electrical storage device 3 becomes less than the predetermined capacity BL. Therefore, in the case where the capacity Bsoc of the electrical storage device 3, which decreases gradually, has reached the predetermined capacity BL, "YES" is determined in the electrical storage device capacity determination step S19C, and "YES" is determined in the rapid cooling control stop determination step S19. Then, the process proceeds to step S21 and subsequent steps thereafter to perform an operation of stopping the rapid cooling control.

With the electrical storage device capacity determination step S19C being provided, the operation of stopping the rapid cooling control of the fuel cell 1 is performed in the state where the capacity required for starting electric power generation of the fuel cell 1 still remains in the electrical storage device 3. Therefore deterioration of the fuel cell 1 can be suppressed, and the fuel cell system 100 can be reliably reactivated after it has been stopped.

In the heat release amount determination step S19D, it is determined whether or not the heat release amount Qout calculated in the heat release amount calculation step S17C has become greater than a predetermined heat release amount QL. Here, the predetermined heat release amount QL is a heat release amount with which the detected coolant temperature TW is assumed to become lower than the second temperature threshold value TL2 if the rapid cooling control is normally performed, for example. In the case where the calculated heat release amount Qout has become greater than the predetermined heat release amount QL, it is assumed either that the detected coolant temperature TW has become lower than the second temperature threshold value TL2, or that any one of the devices that constitutes the fuel cell system 100 is malfunctioning. Accordingly, "YES" is determined in the heat release amount determination step S19D, and "YES" is determined in the rapid cooling control stop determination step S19, and the process proceeds to step S21 and subsequent steps thereafter to perform an operation of stopping the rapid cooling control.

By providing the heat release amount determination step S19D, the rapid cooling control of the fuel cell 1 ends when the heat release amount Qout of the coolant becomes greater than the predetermined heat release amount QL. Therefore it is possible to suppress wasteful electric power consumption after the fuel cell 1 has been sufficiently cooled by the coolant. Moreover, in a case where the heat release amount Qout of the coolant has become greater than the predetermined heat release amount QL even though the coolant temperature has not become lower than the second temperature threshold value TL2, a malfunction of some device that constitutes the fuel cell system 100 may be assumed. Therefore early detection of a malfunction of a device that constitutes the fuel cell system 100 is possible.

In this manner, in the case where "YES" is determined in any one of the detected coolant temperature determination step S19A, the rapid cooling control time determination step S19B, the electrical storage device capacity determination step S19C, and the heat release amount determination step S19D, "YES" is determined in the rapid cooling control stop determination step S19, and the process proceeds to step S21 and subsequent steps thereafter to perform the operation of stopping the rapid cooling control.

On the other hand, in the case where "NO" is determined with all determining factors in the detected coolant temperature determination step S19A the rapid cooling control time determination step S19B, the electrical storage device capacity determination step S19C, and the heat release amount determination step S19D, "NO" is determined in the rapid cooling control stop determination step S19, and the process returns to step S17 to continue to perform the rapid cooling control and detect the state of the fuel cell system 100.

In step S21, the flow path switching control device 61 of the controller 60 stops energizing the heater 46, and stops heat application to the thermostat valve 45. The thermostat valve 45 is cooled to a temperature lower than or equal to the switching temperature (that is, lower than or equal to the first temperature threshold value TL1) by the coolant being at a temperature lower than the second temperature threshold value TL2. As a result, the thermostat valve 45 closes the radiator circulation path 53 side valve, and opens the bypass circulation path 55 side valve.

In step 23, the first coolant pump 41 and the second coolant pump 42 are stopped.

In step S25, the radiator fan 44 is stopped.

At the time when the radiator fan 44 is stopped, the rapid cooling control of the fuel cell 1 ends, and the stop control of the fuel cell 1 ends.

(Effect)

According the present embodiment, after the fuel cell 1 has stopped generating electric power, the flow path switching control device 61 supplies coolant to the radiator circulation path 53 until the temperature of the coolant becomes the second temperature threshold value TL2, which is lower than the first temperature threshold value TL1 (step S7 through step S13). Therefore, heat release of the coolant can be effectively performed with the radiator 43. Consequently with rapid cooling control after the fuel cell 1 has stopped generating electric power, the fuel cell 1 can be rapidly cooled until the second temperature threshold value TL2, which is lower than the first temperature threshold value TL1, has been reached. As a result, deterioration of the fuel cell 1 can be suppressed.

Furthermore, since the flow path switching valve is provided as the thermostat valve 45, the fuel cell system 100 can be configured at a lower cost compared to the case of using a three-way valve for example. Moreover, by setting the switching temperature of the thermostat valve 45 to a predetermined value, it is possible without performing special control, to switch automatically between the radiator circulation path 53 and the bypass circulation path 55 when the temperature of the coolant becomes the switching temperature. Consequently by providing the flow path switching valve as a thermostat valve 45, it is possible to switch easily between the radiator circulation path 53 and the bypass circulation path 55.

Moreover, since there is provided a heater 46 that heats the thermostat valve 45, it is possible, by controlling the temperature of the heater 46, to switch between the radiator circulation path 53 and the bypass circulation path 55 regardless of the temperature of the coolant. Consequently by heating the thermostat valve 45 with the heater 46 and bringing it to a temperature higher than the first temperature threshold value TL1, the coolant that is treated artificially as being at a temperature higher than the first temperature threshold value TL1 can be supplied to the radiator circulation path 53 even if the coolant temperature is actually lower than or equal to the first temperature threshold value TL1. In addition, unlike the fuel cell system disclosed in Japanese Unexamined Patent Application, First Publication No. 2010-67394, the thermostat valve 45 is heated and switched without applying heat to the coolant, and therefore the cooling efficiency of the coolant can be improved. Accordingly, after the fuel cell 1 has stopped generating electric power, the coolant can be supplied to the radiator circulation path 53 until the temperature of the coolant reaches the second temperature threshold value TL2. Therefore the fuel cell 1 can be rapidly cooled and deterioration of the fuel cell 1 can be suppressed. As described above, by providing the flow path switching valve as the thermostat valve 45, and providing the heater 46 that heats the thermostat valve, control can be simplified and deterioration of the fuel cell 1 can be suppressed at the same time.

Second Embodiment

Hereunder, a second embodiment of the present invention is described, with reference to the drawings. Similarly in the following description, a fuel cell system to be mounted on a vehicle is taken as an example. The constituents that are commonly used in the above embodiment are given the same reference symbols and detailed descriptions thereof may be omitted.

Figure 6:
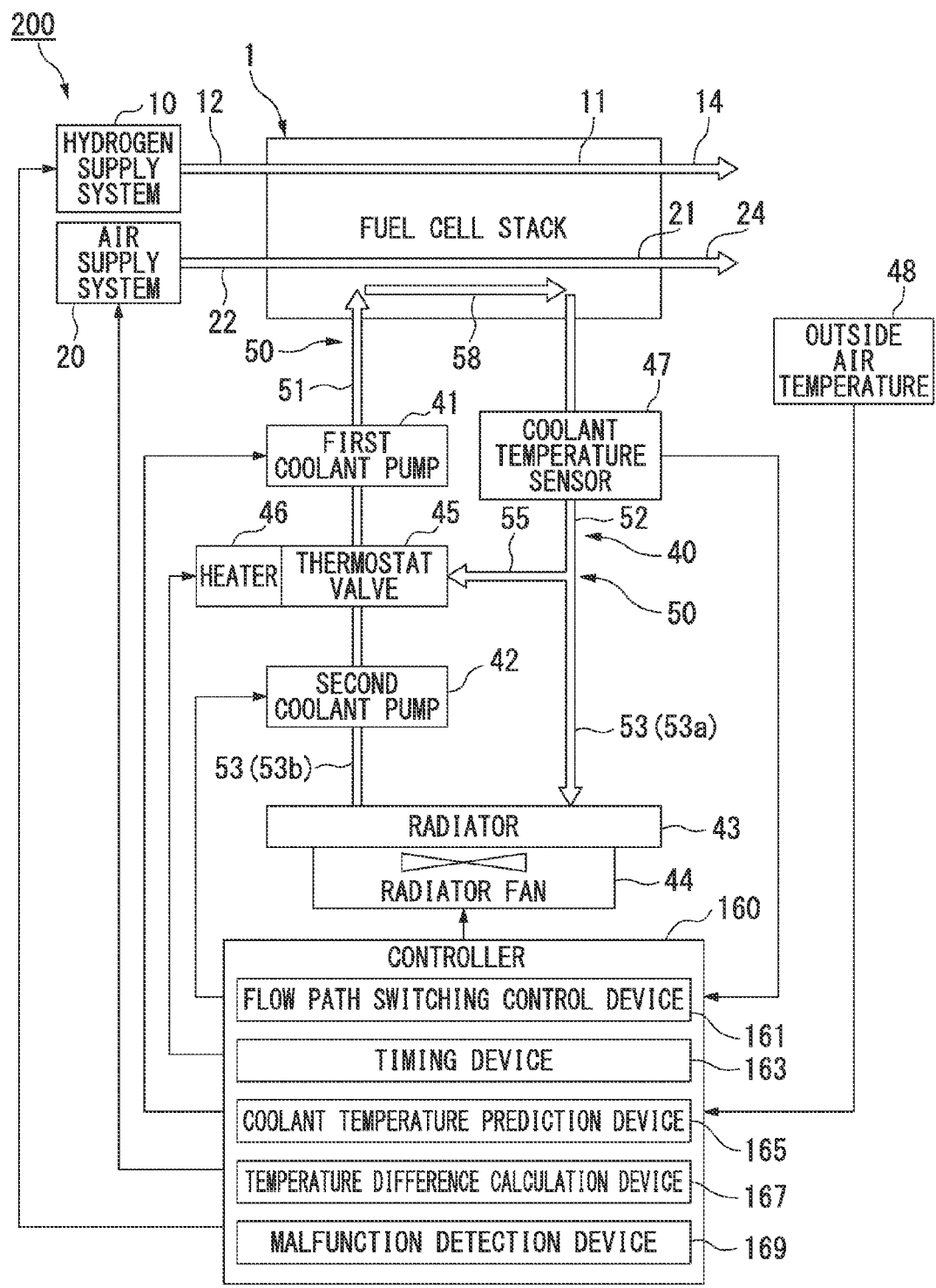
FIG. 6 is a block diagram showing a schematic configuration of a fuel cell system of a second embodiment according to the present invention.

FIG. 6 is a block diagram showing a schematic configuration of a fuel cell system 200.

A fuel cell 1 generates electric power upon an electrochemical reaction between a fuel gas and an oxidant gas. Electric power generated by the fuel cell 1 is supplied to an external load (not shown in figure) such as a motor of a vehicle. The vehicle drives the motor with the electric power generated by the fuel cell 1 to travel.

On a coolant introduction path 51 there is arranged a first coolant pump 41. Moreover, on a radiator discharge path 53*b* there is arranged a second coolant pump 42. The first coolant pump 41 and the second coolant pump 42 are driven based on commands from a controller 160 (control portion) described later, and they pressure-feed and circulate the coolant within the coolant circulation path 50.

On a coolant discharge path 52 there is arranged a coolant temperature sensor 47. The coolant temperature sensor 47 detects the temperature of the coolant that has been discharged from the fuel cell 1. The coolant temperature sensor 47 is arranged in close proximity of the fuel cell 1, on the coolant discharge path 52. Therefore, the temperature of the coolant detected by the coolant temperature sensor 47 (detected temperature, detected coolant temperature TW) becomes substantially the same as the internal temperature of the fuel cell 1.

(Thermostat Valve)

At the connection part between a bypass circulation path 55, the coolant introduction path 51, and the radiator circulation path 53 (radiator discharge path 53*b*), there is arranged a thermostat valve 45.

The thermostat valve 45 is provided with a heater 46 that heats the thermostat valve 45. The heater 46 is fixed, for example, on a side of the thermostat valve 45. The heater 46 is a so-called electric heater composed, for example, of an electric resistor, and it generates heat when energized. As described later, in stop control of the fuel cell 1 that is performed after the fuel cell 1 has stopped generating electric power, the heater 46 applies heat to the thermostat valve 45 based on commands from the controller 160. As a result, even when the temperature of the coolant is lower than or equal to the first temperature threshold value TL1, the thermostat valve 45 can automatically switch the flow path of the coolant due to the heat from the heater 46, and the coolant can be supplied to the radiator circulation path 53.

(Controller)

The fuel cell system 200 is provided with a controller 160. The controller 160 is connected electrically to a hydrogen supply system 10, an air supply system 20, an outside air temperature sensor 48 that detects outside air temperature, and the respective cooling system devices that constitute a cooling system unit 40. The controller 160 performs stop control of the fuel cell 1 described later by controlling the respective cooling system devices.

The controller 160 is provided with a flow path switching control device 161. The flow path switching control device 161 controls heat application to the thermostat valve 45 performed by the heater 46 so that the coolant is supplied to the radiator circulation path 53 until the detected coolant temperature TW becomes the second temperature threshold value TL2 (for example, approximately 25° C. that is the same as the outside air temperature) that is lower than the first temperature threshold value TL1, after the fuel cell 1 has stopped generating electric power.

Specifically, after the fuel cell 1 has stopped generating electric power, the flow path switching control device 161 energizes the heater 46 to apply heat to the thermostat valve 45, opens the radiator circulation path 53 side valve of the thermostat valve 45, and closes the bypass circulation path 55 side valve. As a result, the coolant circulates within the radiator 43 and releases heat after it has absorbed heat from the fuel cell 1, and the temperature of the coolant is rapidly reduced. The flow path switching control device 161 energizes the heater 46 until the detected coolant temperature TW becomes the second temperature threshold value TL2. As a result, the coolant flows through the radiator circulation path 53 until the temperature of the coolant becomes the second temperature threshold value TL2 after the fuel cell 1 has stopped generating electric power, and therefore, the radiator 43 can effectively release heat of the coolant.

Moreover, the controller 160 is provided with a timing device 163, a coolant temperature prediction device 165, a temperature difference calculation device 167, and a malfunction detection device 169.

The timing device 163 times a length of time elapsed since the moment when the fuel cell 1 stopped generating electric power, and it determines whether or not a predetermined length of time has elapsed since the moment when fuel cell 1 stopped generating electric power.

The coolant temperature prediction device 165 predicts the coolant temperature based on: the length of elapsed time timed by the timing device 163; the detected coolant temperature detected by the coolant temperature sensor 47 at the time when the fuel cell 1 has stopped generating electric power (hereunder, referred to as "detected stop-time temperature TW0"); the outside air temperature detected by the outside air temperature sensor 48 (hereunder, referred to as "detected outside air temperature TO"); and the driving Duty of the radiator fan 44. The method of the coolant temperature prediction device 165 for predicting coolant temperature is described later.

The temperature difference calculation device 167 compares the predicted coolant temperature predicted by the coolant temperature prediction device 165 (hereunder, referred to as "predicted temperature TF") with the detected coolant temperature TW detected by the coolant temperature sensor 47, to thereby calculate the temperature difference Ts between the predicted temperature TF and the detected coolant temperature TW.

The malfunction detection device 169 determines whether or not any one of the respective cooling system devices is malfunctioning, based on whether or not the temperature difference Ts calculated by the temperature difference calculation device 167 is higher than or equal to a preset malfunction determination threshold value T1 after the fuel cell 1 has stopped generating electric power. The method of the malfunction detection device 169 that detects malfunction of the respective cooling system devices is described later.

(Fuel Cell Stop Control Method)

Next, a stop control method of the fuel cell 1 according to the embodiment is described.

Figure 7:
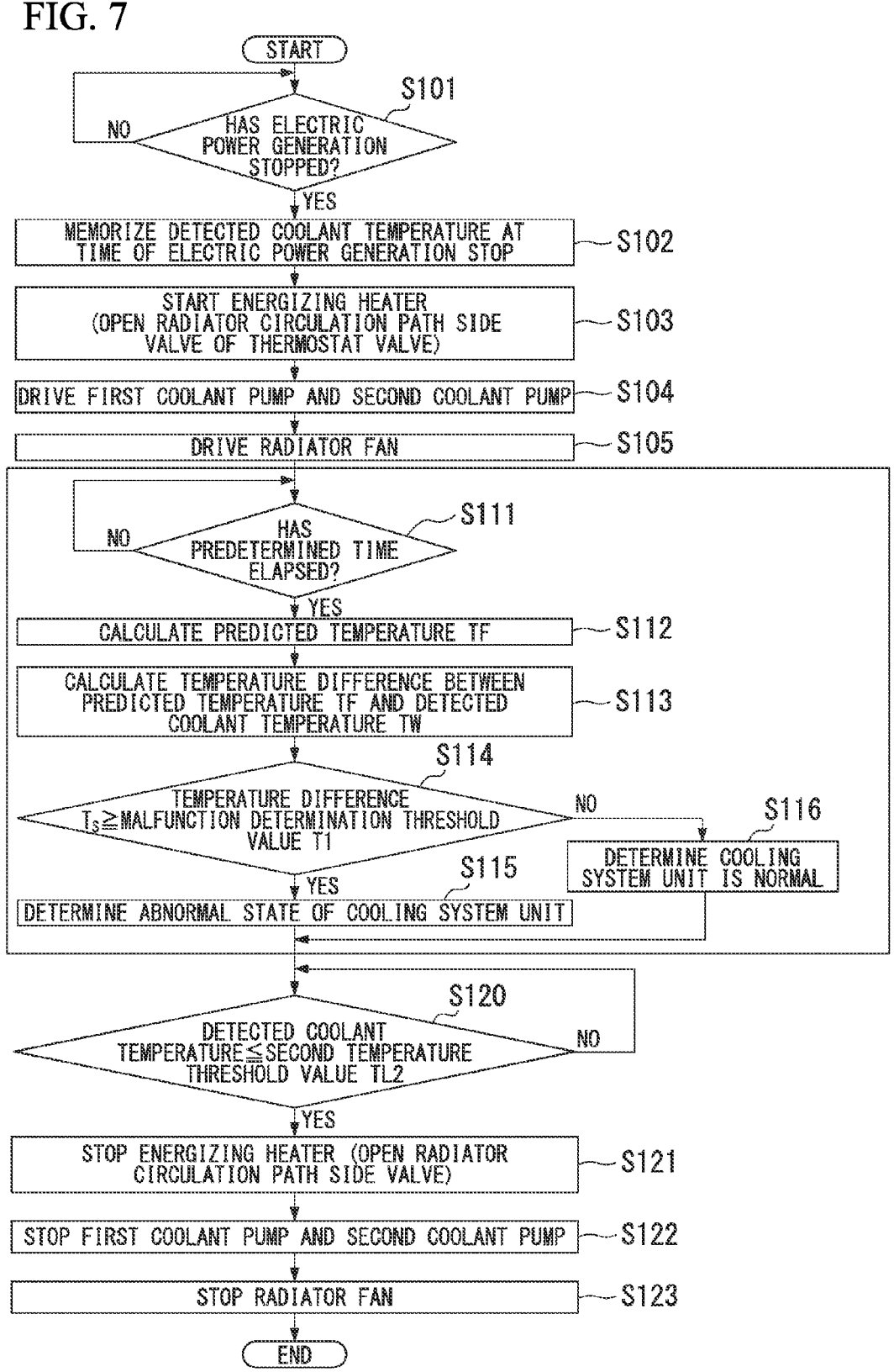
FIG. 7 is a flow chart of a stop control method of the fuel cell of the second embodiment according to the present invention.

FIG. 7 is a flow chart of the stop control method of the fuel cell 1 (refer to FIG. 6) according to the embodiment. Hereunder, each step (step S101 through step S123) of the stop control method of the fuel cell 1 is described using the figures. Refer to FIG. 6 for reference symbols of the respective components that constitute the fuel cell system in the description of the flow chart in FIG. 7 and the descriptions of the graphs in FIG. 8 and subsequent figures thereafter.

As shown in FIG. 7, first, in step S101, it is determined whether or not the fuel cell 1 is in the electric power generation stop state. To determine whether or not the fuel cell 1 is in the electric power generation stop state, for example, the controller 160 reads the state of an ignition switch (not shown in figure). Specifically, if the ignition switch is in the OFF state, "YES" is determined in step S101 where the fuel cell 1 is treated as being in the electric power generation stop state, and the process proceeds to the next step S102. On the other hand, if the ignition switch is in the ON state, "NO" is determined in step S101 where the fuel cell 1 is treated as being in the electric power generating state, and the state of the ignition switch is read again.

In step S102, immediately after the fuel cell 1 has been determined in step S101 as being in the electric power generation stop state, the detected stop-time temperature TW0 detected by the coolant temperature sensor 47 is memorized in the controller 160. The detected stop-time temperature TW0 memorized in the controller 160 is used for the coolant temperature prediction device 165 to calculate a predicted coolant temperature TF.

In step S103, the flow path switching control device 161 of the controller 160 starts energizing the heater 46, and applies heat to the thermostat valve 45. As a result, the thermostat valve 45 opens the radiator circulation path 53 side valve, and closes the bypass circulation path 55 side valve.

In step 104, the first coolant pump 41 and the second coolant pump 42 are driven. The coolant within the coolant circulation path 50 is pressure-fed by the first coolant pump 41 and the second coolant pump 42, and flows through the radiator 43 to circulate between the inside and the outside of the fuel cell 1.

In step S105, the radiator fan 44 is driven at a predetermined driving Duty. The radiator fan 44 supplies cooling air to the radiator 43. As a result, the coolant can efficiently release heat from the radiator 43 after absorbing heat from the fuel cell 1, and therefore, the fuel cell 1 can be rapidly cooled.

(Malfunction Detection of Cooling System Unit)

Steps S111 to S116 are a subroutine for malfunction detection of the cooling system unit 40, and are performed by the malfunction detection device 169 of the controller 160.

In step S111, it is determined whether or not the length of time timed by the timing device 163 of the controller 160 has exceeded a predetermined length of time since the moment when the fuel cell 1 stopped generating electric power. Here, the predetermined length of time refers to a length of time in which it is assumed that the coolant temperature has become lower than or equal to the first temperature threshold value TL1, which is the switching temperature of the thermostat valve 45.

In the case where the predetermined length of time has elapsed since the moment when the fuel cell 1 stopped generating electric power, "YES" is determined in step S111, and the coolant temperature is determined as being lower than or equal to the first temperature threshold value TL1, which is the switching temperature of the thermostat valve 45. Then, the process proceeds to the next step S112. On the other hand, in the case where the predetermined length of time has not elapsed since the moment when the fuel cell 1 stopped generating electric power, "NO" is determined in step S111, and the coolant temperature is determined as being higher than the first temperature threshold value TL1, which is the switching temperature of the thermostat valve 45. Then, the timed length of time timed by the timing device 163 is read again.

Figure 8:
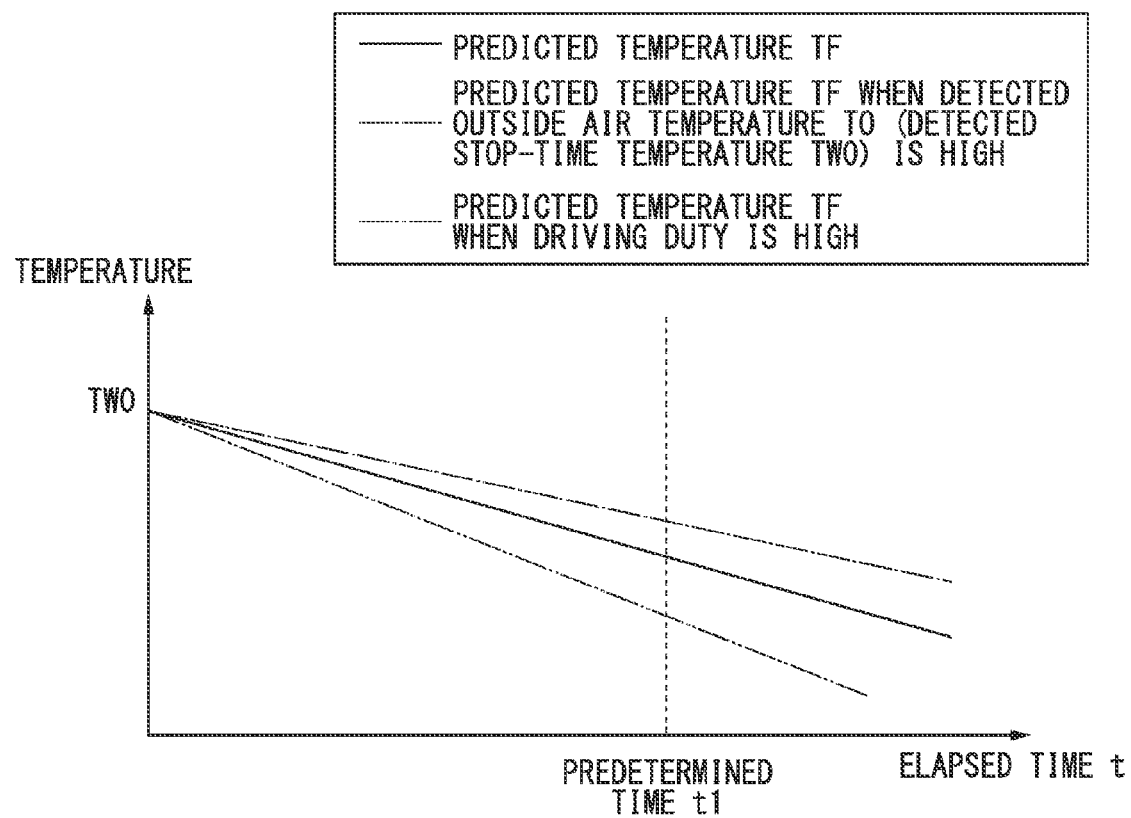
FIG. 8 is an explanatory diagram for predicted temperatures where the vertical axis represents temperature and the horizontal axis represents the length of time elapsed since the moment when the fuel cell stopped generating electric power.

FIG. 8 is an explanatory diagram for predicted temperatures TF where the vertical axis represents temperature and the horizontal axis represents the length of time t elapsed since the moment when the fuel cell 1 stopped generating electric power.

Figure 9:
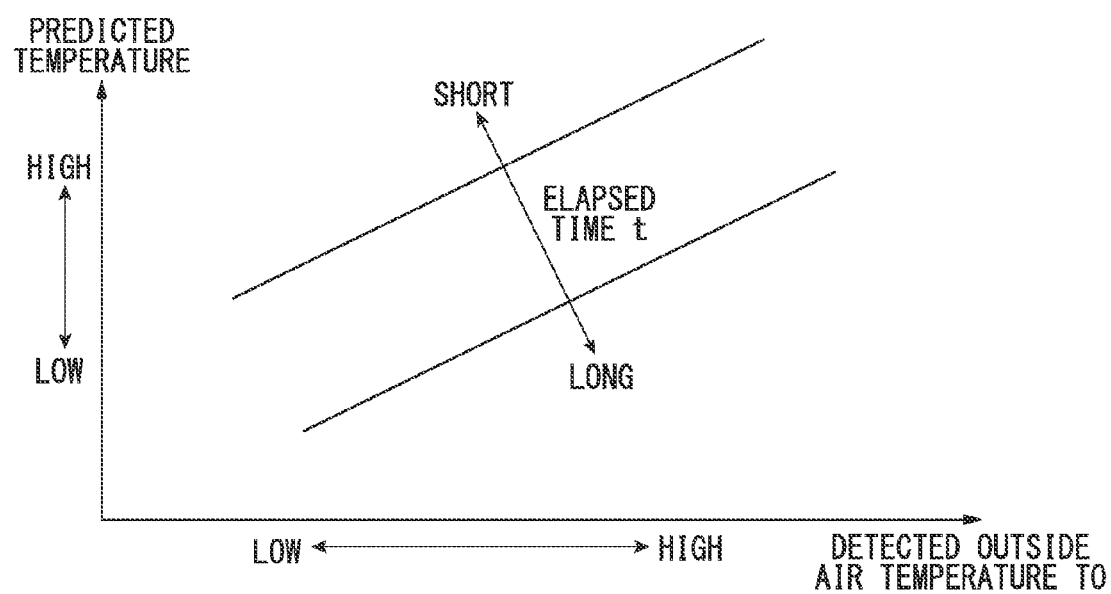
FIG. 9 is an explanatory diagram for predicted temperatures where the vertical axis represents predicted temperatures and the horizontal axis represents detected outside air temperatures.

FIG. 9 is an explanatory diagram for predicted temperatures where the vertical axis represents predicted temperatures TF and the horizontal axis represents detected outside air temperatures TO.

Figure 10:
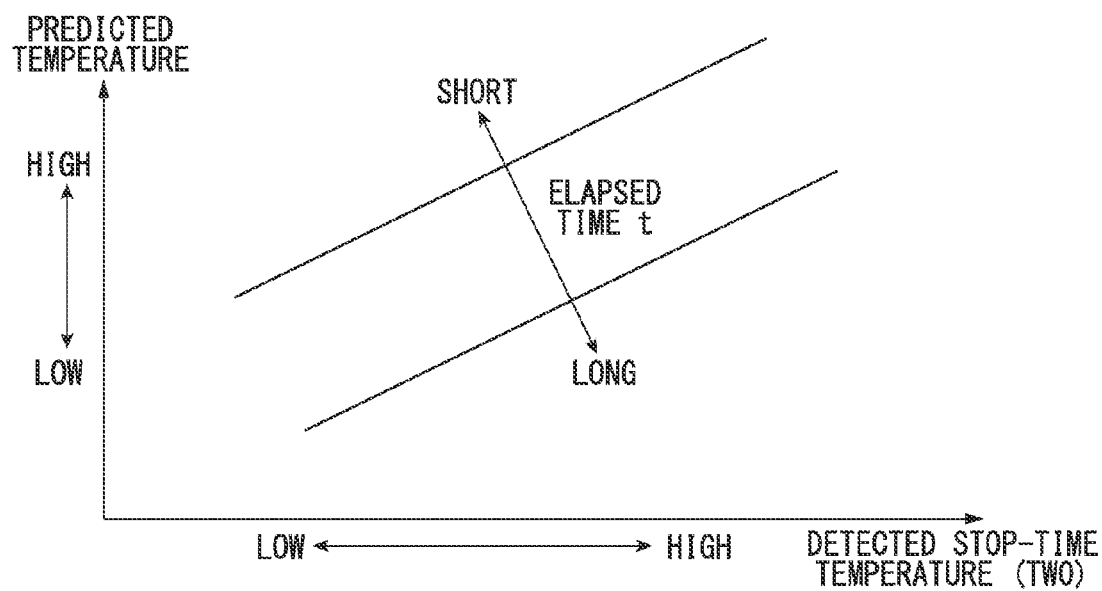
FIG. 10 is an explanatory diagram for predicted temperatures where the vertical axis represents predicted temperatures and the horizontal axis represents detected temperatures in a stop state.

FIG. 10 is an explanatory diagram for predicted temperatures where the vertical axis represents predicted temperatures TF and the horizontal axis represents detected stop-time temperatures TW0.

Figure 11:
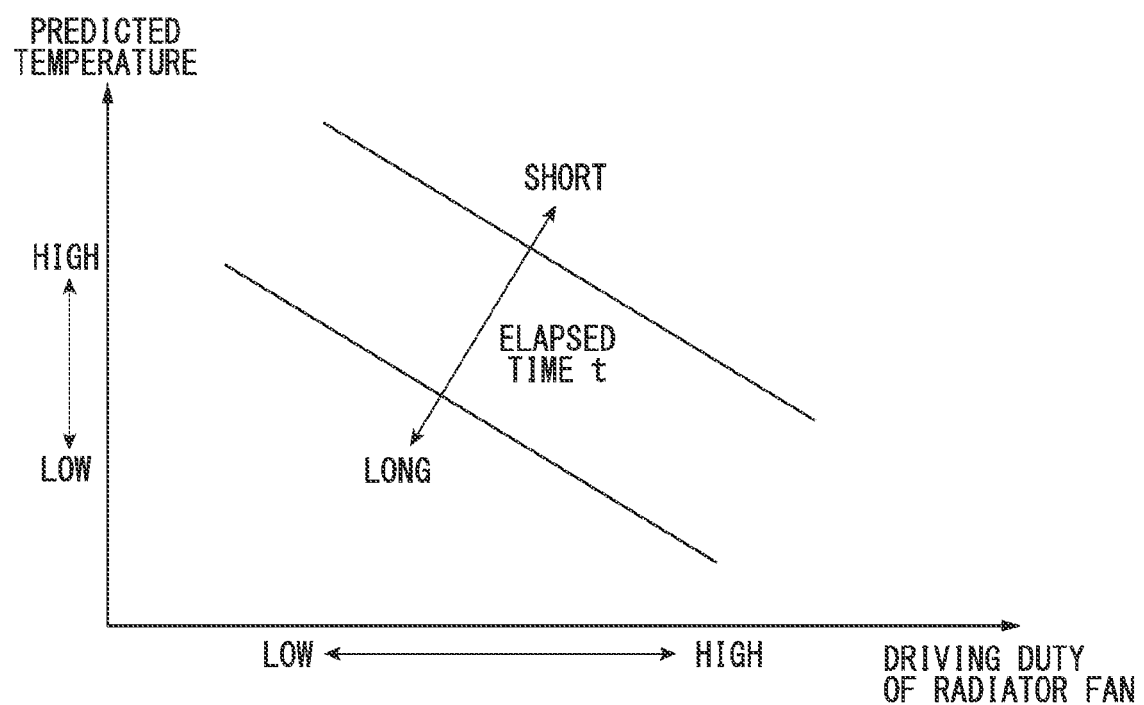
FIG. 11 is an explanatory diagram for predicted temperatures where the vertical axis represents predicted temperatures and the horizontal axis represents driving Duties of the radiator fan.

FIG. 11 is an explanatory diagram for predicted temperatures where the vertical axis represents predicted temperatures TF and the horizontal axis represents driving Duties of the radiator fan 44.

In step S112, the coolant temperature prediction device 165 of the controller 160 predicts the temperature of the coolant. The elapsed time t, predicted temperature TF based on the detected stop-time temperature TW0, the detected outside air temperature TO, and the driving Duty of the radiator fan 44 are preliminarily memorized as a map in the coolant temperature prediction device 165 of the controller 160 for example.

As shown in FIG. 8, after the fuel cell 1 has stopped generating electric power, the coolant flows through the radiator 43 to be cooled (step S103 and subsequent steps thereafter in FIG. 7). Therefore, the predicted temperature TF decreases monotonically from the detected stop-time temperature TW0, as the elapsed time t becomes longer.

As shown in FIG. 9, after the fuel cell 1 has stopped generating electric power, when the detected outside air temperature TO is high, the temperature of coolant tends to become high. Therefore, the predicted temperature TF becomes monotonically higher as the detected outside air temperature TO becomes higher. Furthermore, when the length of time t elapsed since the moment when the fuel cell 1 stopped generating electric power is short, the length of coolant cooling time also becomes short, and therefore, the predicted temperature TF becomes high.

As shown in FIG. 10, after the fuel cell 1 has stopped generating electric power, when the detected stop-time temperature TW0 is high, the temperature of coolant tends to become high. Therefore, the predicted temperature TF becomes monotonically higher as the detected stop-time temperature TW0 becomes higher. Furthermore, when the length of time t elapsed since the moment when the fuel cell 1 stopped generating electric power is short, the length of coolant cooling time also becomes short, and therefore, the predicted temperature TF becomes high.

Moreover, as shown in FIG. 11, if the driving Duty of the radiator fan 44 is high, the rotation speed of the radiator fan 44 becomes high, and heat release of the coolant is promoted. Therefore, the predicted temperature TF becomes monotonically lower as the driving Duty of the radiator fan 44 becomes higher. Furthermore, when the length of time t elapsed since the moment when the fuel cell 1 stopped generating electric power is long, the length of coolant cooling time also becomes long, and therefore, the predicted temperature TF becomes low.

The predicted temperature TF in step S112 is calculated based on the map that combines: the predicted temperature TF map based on the elapsed time t shown in FIG. 8; the predicted temperature TF map based on the detected outside air temperature TO shown in FIG. 9; the predicted temperature TF map based on the detected stop-time temperature TW0 shown in FIG. 10; and the predicted temperature TF map based on the driving Duty shown in FIG. 11.

Specifically, for example, when the detected outside temperature TO is high, the temperature at the time of starting coolant cooling becomes high. Therefore, the predicted temperature TF map in this case (refer to the chain dashed line in the graph of FIG. 8) shows that the temperature shifts to the high side, and the decreasing rate of the temperature becomes smaller. Also in the case where the detected stop-time temperature TW0 is high, the temperature shifts to the high side and the decreasing rate of the coolant temperature becomes smaller for the same reason.

Moreover, for example, when the driving Duty of the radiator fan 44 is high, heat release of the coolant is promoted. Therefore, the predicted temperature TF map in this case (refer to the chain double-dashed line in the graph of FIG. 8) shows that the temperature shifts to the low side, and the decreasing rate of the temperature becomes greater.

When the predicted temperature TF at the predetermined time t1 has been calculated, the process proceeds to the next step S113.

In step S113, the temperature difference calculation device 167 of the controller 160 reads the detected coolant temperature at the predetermined time t1, and calculates the temperature difference Ts between the predicted temperature TF calculated in step S112, and the detected coolant temperature TW at the predetermined time t1. Here, the temperature difference Ts is an absolute value of the difference between the predicted temperature TF at the predetermined time t1 and the detected coolant temperature TW.

Figure 12:
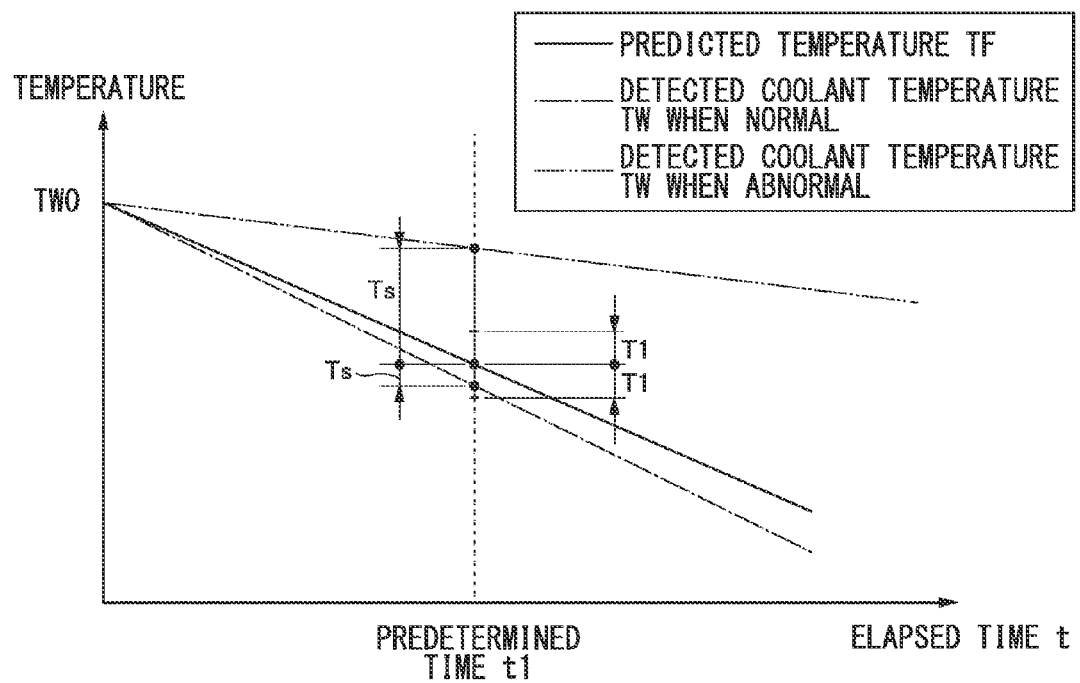
FIG. 12 is an explanatory diagram for a malfunction detection in step S114.

FIG. 12 is an explanatory diagram for a malfunction detection in step S114.

In step S114, the malfunction detection device 169 of the controller 160 compares the temperature difference Ts calculated in step S113 with a preset malfunction determination threshold value T1, and determines whether or not the temperature difference Ts is greater than or equal to the malfunction determination threshold value T1.

Specifically, as shown in FIG. 12, "YES" is determined in step S114 in the case where the temperature difference Ts between the predicted temperature TF and the detected coolant temperature TW (refer to the chain double-dashed line in the graph of FIG. 12) is greater than or equal to the malfunction determination threshold value T1. As a result, the cooling system unit 40 is determined as being in an abnormal state (step S115), and it is determined that any one of the respective cooling system devices that constitute the cooling system unit 40 is malfunctioning.

On the other hand, "NO" is determined in step S114 in the case where the temperature difference Ts between the predicted temperature TF and the detected coolant temperature TW (refer to the chain dashed line in the graph of FIG. 12) is less than the malfunction determination threshold value T1. As a result, the cooling system unit 40 is determined as being in the normal state (step S116), and it is determined that none of the respective cooling system devices that constitute the cooling system unit 40 is malfunctioning.

When whether or not the cooling system unit 40 is malfunctioning has been determined, the subroutine for the malfunction detection process flow of the cooling system unit 40 ends, and the process proceeds to the next step S120.

In step S120, it is determined whether or not the detected coolant temperature TW is less than or equal to the second temperature threshold value TL2.

In the case where the detected coolant temperature TW is less than or equal to the second temperature threshold value TL2, "YES" is determined in step S120 and the coolant temperature is determined as having sufficiently decreased, and the process proceeds to the next step S121.

On the other hand, in the case where the detected coolant temperature TW is higher than the second temperature threshold value TL2, "NO" is determined in step S120 and the coolant temperature is determined as not having sufficiently decreased, and the detected coolant temperature TW is read again.

In step S121, the flow path switching control device 161 of the controller 160 stops energizing the heater 46, and stops heat application to the thermostat valve 45. As a result, the thermostat valve 45 is cooled to a temperature lower than or equal to the switching temperature (that is, less than or equal to the first temperature threshold value TL1) by the coolant at a temperature lower than or equal to the second temperature threshold value TL2, and it closes the radiator circulation path 53 side valve and opens the bypass circulation path 55 side valve.

In step 122, the first coolant pump 41 and the second coolant pump 42 are stopped.

In step S123, the radiator fan 44 is stopped.

When the radiator fan 44 has stopped, the process flow of the stop control method of the fuel cell 1 ends.
(Effect)

According to the present embodiment, after the fuel cell 1 has stopped generating electric power, the flow path switching control device 161 supplies coolant to the radiator circulation path 53 until the temperature of the coolant becomes the second temperature threshold value TL2, which is lower than the first temperature threshold value TL1 (step S120). Therefore heat release of the coolant can be effectively performed with the radiator 43. As a result, the fuel cell 1 can be rapidly cooled after the fuel cell 1 has stopped generating electric power, and therefore, deterioration of the fuel cell 1 can be suppressed.

Moreover, since a malfunction of the cooling system unit 40 can be detected every time the fuel cell 1 stops generating electric power, a malfunction of the cooling system unit 40 can be detected more frequently than in the case of detecting a malfunction of the cooling system unit 40 only when the fuel cell 1 is generating electric power. Therefore, a malfunction of the cooling system unit 40 can be promptly detected. In addition, a malfunction of the cooling system unit 40 is detected by supplying the coolant to the radiator circulation path 53 until the temperature of the coolant reaches the second temperature threshold value TL2, which is lower than the first temperature threshold value TL1, and thereby comparing it with a malfunction determination threshold value T1 when the decreasing rate of the coolant temperature is high. Therefore the difference between a predicted temperature TF and the detected coolant temperature TW tends be great when the cooling system unit 40 malfunctions. Consequently a malfunction of the cooling system unit 40 can be detected reliably at a high level of precision.

(Modified Example of Embodiment)

Figure 13:
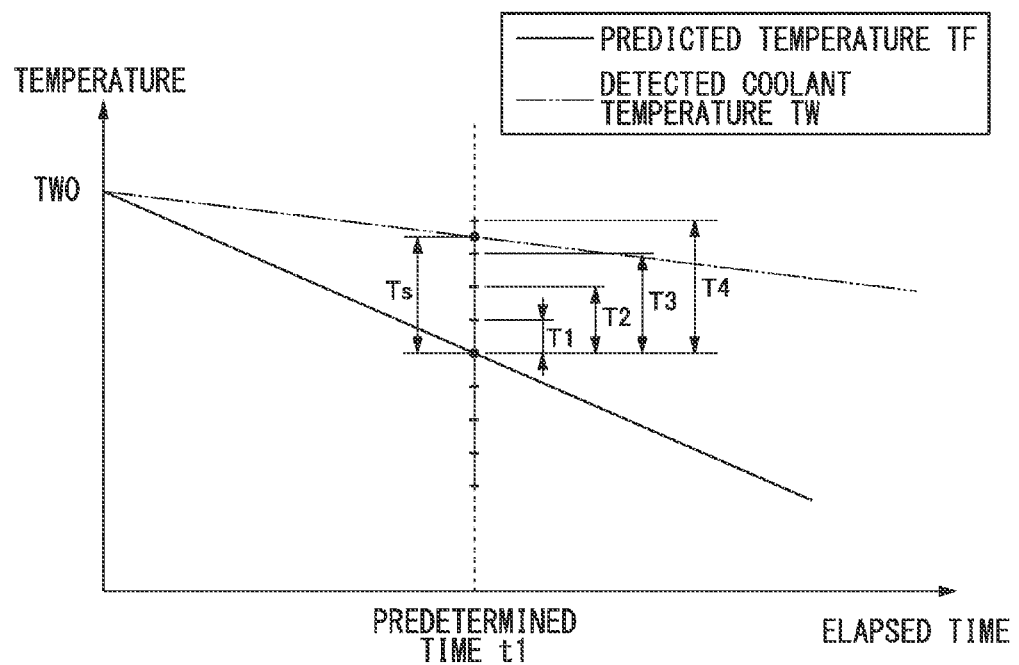
FIG. 13 is an explanatory diagram for a modified example of a malfunction detection in step S114.

FIG. 13 is an explanatory diagram for malfunction detection according to a modified example of the embodiment.

In the embodiment, in step S114, the temperature difference Ts and the malfunction determination threshold value T1 are compared, and whether or not the temperature difference Ts is greater than or equal to the malfunction determination threshold value T1 is determined, to determine whether or not any one of the respective cooling system devices is malfunctioning.

On the other hand, the modified example of the embodiment differs from the embodiment in that, in step S114, in addition to comparing the temperature difference Ts and the malfunction determination threshold value T1, and determining whether or not the temperature difference Ts is greater than or equal to the malfunction determination threshold value T1, to determine whether or not any one of the respective cooling system devices is malfunctioning, which one of the respective cooling system devices is malfunctioning is determined. Descriptions of the constituent portions similar to those in the embodiment are omitted.

As shown in FIG. 13, in the malfunction detection device 169, in addition to the malfunction determination threshold value T1, there are preliminarily set a second malfunction determination threshold value T2 that is greater than the malfunction determination threshold value T1, a third malfunction determination threshold value T3 that is greater than the second malfunction determination threshold value T2, and a fourth malfunction determination threshold value T4 that is greater than the third malfunction determination threshold value T3.

In the case where the temperature difference Ts between the predicted temperature TF and the detected coolant temperature TW (refer to the chain double-dashed line in the graph of FIG. 13) is greater than or equal to the malfunction determination threshold value T1, "YES" is determined in step S114. As a result, the cooling system unit 40 is determined as being in an abnormal state (step S115), and any one of the respective cooling system devices (first coolant pump 41, second coolant pump 42, radiator fan 44, thermostat valve 45, heater 46, and coolant temperature sensor 47) that constitute the cooling system unit 40 is determined as being malfunctioning.

Furthermore, in step S114, the process determines which one of the first coolant pump 41, the second coolant pump 42, the radiator fan 44, the thermostat valve 45, the heater 46, and the coolant temperature sensor 47 is malfunctioning, according to the magnitude of the temperature difference Ts.

Specifically, when the following formula is satisfied, the malfunction detection device 169 determines that at least either one of the first coolant pump 41 and the second coolant pump 42 is malfunctioning.

$$T1 \leq Ts < T2 \tag{1}$$

The reason for this is that the temperature difference Ts between the predicted temperature TF and the detected coolant temperature TW is considered not to be very significant, because, even if either one of the first coolant pump 41 and the second coolant pump 42 is malfunctioning, the other coolant pump is still capable of operating and coolant can still be circulated.

Moreover, when the following formula is satisfied, the malfunction detection device 169 determines that at least the radiator fan 44 is malfunctioning.

$$T2 \leq Ts < T3 \tag{2}$$

The reason for this is that the temperature difference Ts between the predicted temperature TF and the detected coolant temperature TW is considered not to be extremely significant, because heat can still be released from the radiator 43 even if the radiator fan 44 is malfunctioning.

Furthermore, when the following formula is satisfied, the malfunction detection device 169 determines that at least either one of the thermostat valve 45 and the heater 46 is malfunctioning.

$$T3 \leq Ts < T4 \tag{3}$$

The reason for this is that the temperature difference Ts between the predicted temperature TF and the detected coolant temperature TW is considered to be significant, because coolant cannot flow through radiator 43 if either one of the thermostat valve 45 and the heater 46 is malfunctioning.

Moreover, when the following formula is satisfied, it is determined that at least the coolant temperature sensor 47 is malfunctioning.

$$T4 \leq Ts \tag{4}$$

The reason for this is that the temperature difference Ts is considered to be extremely significant because if the coolant temperature sensor 47 is malfunctioning, the detected coolant temperature TW would stay, for example, at 0° C., showing an abnormal value.

FIG. 13 shows an example of the graph of detected coolant temperatures TW. The detected coolant temperature TW (refer to chain double-dashed line) shown in FIG. 13 illustrates that the temperature difference Ts between the predicted temperature TF and the detected coolant temperature TW satisfies the formula (3). Therefore in step S114, the malfunction detection device 169 determines that at least either one of the thermostat valve 45 and the heater 46 is malfunctioning.

According to the modified example of the embodiment, a malfunctioning cooling system device can be easily identified among a plurality of cooling system devices, and therefore, maintenance operations can be promptly performed thereafter.

The technical scope of the present invention is not limited to the above embodiments, and various modifications may be made without departing from the scope of the invention.

In the above embodiments, a thermostat valve 45 is employed as a flow path switching valve. However, there may be employed a three-way valve. However, the thermostat valve 45 is capable of switching automatically between the radiator circulation path 53 and the bypass circulation path 55. Therefore, the above embodiments are superior in that the radiator circulation path 53 and the bypass circulation path 55 can be easily switched without performing a special control, and the fuel cell systems 100 and 200 can be configured at low cost.

In the above embodiments there are provided two coolant pumps, namely a first coolant pump 41 and a second coolant pump 42. However, the number of coolant pumps is not limited to those in the embodiments, and a single pump may be provided. However, the above embodiments are superior in that, by providing two coolant pumps, the flow rate of coolant can be increased compared to the case of using a single coolant pump, and at the same time, precise control can be achieved with respect to the coolant flow rate target value.

In the first embodiment, the winter season determination is performed using the outside air temperature Tout detected by the outside air temperature sensor 48. On the other hand, the winter season determination may be performed based, for example, on calendar information available within the controller 60, or weather information that can be obtained from a communication device or a GPS (global positioning system) provided on the vehicle.

In the above embodiments, the descriptions are provided with the example of the fuel cell systems 100 and 200 to be mounted on a vehicle. However, application of the fuel cell systems 100 and 200 of the present invention is not limited to a vehicle.

In the above embodiments there are provided two coolant pumps, namely a first coolant pump 41 and a second coolant pump 42. However, the number of coolant pumps to be provided may be one. However, the above embodiments are superior in that, by providing two coolant pumps, the flow rate of coolant can be increased compared to the case of using a single coolant pump, and at the same time, precise control can be achieved with respect to the coolant flow rate target value.

In the first embodiment, the first coolant pump 41 is arranged on the coolant discharge path 52 while the second coolant pump 42 is arranged on the coolant introduction path 51, and in the second embodiment, first coolant pump 41 is arranged on the coolant introduction path 51 while the second coolant pump 42 is arranged on the radiator circulation path 53. However, the arrangement position of the first coolant pump 41 and the second coolant pump 42 is not limited to those in the embodiments. For example, the first coolant pump 41 may be arranged on the coolant introduction path 51, and the second coolant pump 42 may be arranged on the coolant discharge path 52.

In the second embodiment, the predicted temperature TF map is created based on all of: elapsed time t, detected outside air temperature T0, and detected stop-time temperature TW0. However, it may be created based at least on elapsed time t. Moreover, the predicted temperature TF map may be created by combining the elapsed time t with any one of detected outside air temperature T0, detected stop-time temperature TW0, and driving Duty.

In the second embodiment, in step S111, whether or not the coolant temperature is less than or equal to the first temperature threshold value TL1 is determined by determining whether or not the timed length of time timed by the timing device 163 of the controller 160 has exceeded the predetermined length of time from the moment where the fuel cell 1 stopped generating electric power. On the other hand, for example, the detected coolant temperature TW detected by the coolant temperature sensor 47 may be read directly, and whether or not it is less than or equal to the first temperature threshold value TL1 may be determined.

In the second embodiment, in the case where the detected coolant temperature TW is higher than the second temperature threshold value TL2, "NO" is determined in step S120 and the coolant temperature is determined as not having sufficiently decreased, and the detected coolant temperature TW is read again. On the other hand, for example, when "NO" is determined in step S120 and the coolant temperature is determined as not having sufficiently decreased, the process may return to step S111. As a result, malfunction detection of the cooling system unit 40 can be repeatedly performed when the decreasing rate of the coolant temperature is high. Consequently a malfunction of the cooling system unit 40 can be detected reliably at a high level of precision.

What is claimed is:

1. A fuel cell system comprising:
   a fuel cell that generates electric power upon a reaction between a fuel gas and an oxidant gas;
   a radiator that releases heat of coolant that cools the fuel cell;
   a coolant pump that circulates the coolant;
   a temperature detection device that detects a temperature of the coolant;
   a coolant introduction path that introduces the coolant to the fuel cell;
   a coolant discharge path that discharges the coolant that has already flowed through the fuel cell;
   a radiator circulation path that supplies the coolant through the radiator and circulates it from the coolant discharge path to the coolant introduction path;
   a bypass circulation path that bypasses the radiator and circulates the coolant from the coolant discharge path to the coolant introduction path;
   a flow path switching valve that is provided at a connection part between the bypass circulation path and the coolant introduction path or between the bypass circulation path and the coolant discharge path, and that is configured to supply the coolant to the bypass circulation path in a case where a temperature of the coolant becomes lower than or equal to a first temperature threshold value while the fuel cell is generating electric power; and
   a control portion configured to perform rapid cooling control of the fuel cell after the fuel cell has stopped generating electric power,
   wherein the control portion comprises a flow path switching control device configured to control the flow path switching valve in rapid cooling control of the fuel cell so as to supply the coolant to the radiator circulation path until a temperature of the coolant becomes a second temperature threshold value that is lower than the first temperature threshold value, wherein the flow path switching valve is a thermostat valve comprising a heater configured to heat the thermostat valve and to allow the thermostat valve to open and close regardless of the temperature of the coolant, and wherein the flow path switching control device is configured to supply the coolant to the radiator circulation path until the temperature of the coolant becomes the second temperature threshold value due to control of heat application to the thermostat valve performed by the heater, even when the temperature of the coolant becomes lower than or equal to the first temperature threshold value, after the fuel cell has stopped generating electric power.

2. The fuel cell system according to claim 1, wherein:
in a case where a rapid cooling control of the fuel cell has started and then a prescribed length of time has elapsed, the control portion stops heat application to the thermostat valve performed by the heater, and ends the rapid cooling control of the fuel cell.

3. The fuel cell system according to claim 1, wherein:
the control portion
starts applying heat to the thermostat valve using the heater and starts circulating the coolant using the coolant pump, in a case where a temperature of the coolant at the time when electric power generation of the fuel cell is stopped is higher than the first temperature threshold value; and
starts circulating the coolant using the coolant pump after a predetermined length of time has elapsed since the moment when the heater started applying heat to the thermostat valve, in a case where a temperature of the coolant at the time when electric power generation of the fuel cell is stopped is lower than or equal to the first temperature threshold value.

4. The fuel cell system according to claim 1, wherein a rotation speed of the coolant pump becomes higher as the temperature of the coolant becomes higher.

5. The fuel cell system according to claim 1, wherein:
there is provided an outside air temperature detection device that detects an outside air temperature;
the control portion is provided with a determination device that determines whether or not to perform a rapid cooling control of the fuel cell after the fuel cell has stopped generating electric power; and
the determination device does not perform the rapid cooling control of the fuel cell in a case where an outside air temperature is even lower than a predetermined outside air temperature that is lower than the first temperature threshold value, or in a case where a temperature of the coolant detected after the fuel cell has stopped generating electric power is even lower than a predetermined coolant temperature that is lower than the first temperature threshold value.

6. The fuel cell system according to claim 1, wherein:
there are provided
an electrical storage device that accumulates electric power generated by the fuel cell and that supplies electric power required for starting electric power generation of the fuel cell, and
a capacity detection portion that detects a capacity of the electrical storage device; and
the rapid cooling control of the fuel cell ends before the capacity of the electrical storage device detected by the capacity detection portion becomes less than a predetermined capacity required for starting electric power generation of the fuel cell.

7. The fuel cell system according to claim 1, wherein:
the control portion is provided with a heat release amount calculation device that calculates a heat release amount of the coolant; and
the rapid cooling control of the fuel cell ends in a case where a heat release amount of the coolant calculated by the heat release amount calculation device becomes greater than a predetermined heat release amount.

8. The fuel cell system according to claim 1,
wherein
the control portion is provided with
a malfunction detection device that detects a malfunction of a cooling system unit that is provided with, as cooling system devices, at least the radiator fan, the coolant pump, the temperature detection device, and the flow path switching valve,
and
the malfunction detection device detects a malfunction of the cooling system unit in a case where, after the fuel cell has stopped generating electric power, a temperature of the coolant is lower than or equal to the first temperature threshold value and it is higher than the second temperature threshold value.

9. The fuel cell system according to claim 8, wherein:
the control portion is provided with
a timing device that times a length of time elapsed since the moment when the fuel cell stopped generating electric power,
a coolant temperature prediction device that predicts the temperature of the coolant based at least on the length of elapsed time timed by the timing device, and
a temperature difference calculation device that compares a predicted temperature predicted by the coolant temperature prediction device, with a detected temperature detected by the temperature detection device, and that thereby calculates a temperature difference between the predicted temperature and the detected temperature, and
the malfunction detection device determines any one of the respective cooling system devices as being malfunctioning in a case where the temperature difference calculated by the temperature difference calculation device is greater than or equal to a preset malfunction determination threshold value.

10. The fuel cell system according to claim 8, wherein the malfunction detection device determines which cooling system device among the respective cooling system devices is malfunctioning, according to the temperature difference calculated by the temperature difference calculation device.

11. A method for controlling a fuel cell system, the method comprising:
generating via a fuel cell electric power upon a reaction between a fuel gas and an oxidant gas;
releasing via a radiator heat of coolant that cools the fuel cell;
circulating via a coolant pump the coolant;
detecting via a detection device a temperature of the coolant;
introducing via a coolant introduction path the coolant to the fuel cell;
discharging via a coolant discharge path the coolant that has already flowed through the fuel cell;

supplying via a radiator circulation path the coolant through the radiator and circulates it from the coolant discharge path to the coolant introduction path;

bypassing via a bypass circulation path the radiator and circulates the coolant from the coolant discharge path to the coolant introduction path;

supplying the coolant to the bypass circulation path in a case where a temperature of the coolant becomes lower than or equal to a first temperature threshold value while the fuel cell is generating electric power via a flow path switching valve that is provided at a connection part between the bypass circulation path and the coolant introduction path or between the bypass circulation path and the coolant discharge path;

performing via a control portion rapid cooling control of the fuel cell after the fuel cell has stopped generating electric power; and controlling the flow path switching valve for, in the rapid cooling control of the fuel cell, supplying the coolant to the radiator circulation path until the temperature of the coolant detected by the temperature detection device has become a second temperature threshold value that is lower than the first temperature threshold value, heating a thermostat valve comprising a heater configured to allow the thermostat valve to open and close regardless of the temperature of the coolant, wherein the flow path switching valve is the thermostat valve, and supplying the coolant to the radiator circulation path, using the flow path switching control device, until the temperature of the coolant becomes the second temperature threshold value due to control of heat application to the thermostat valve performed by the heater, even when the temperature of the coolant becomes lower than or equal to the first temperature threshold value, after the fuel cell has stopped generating electric power.

12. The method for controlling a fuel cell system according to claim 11, further comprising:

detecting a malfunction of a cooling system unit that is provided with, as cooling system devices, at least the radiator fan, the coolant pump, the temperature detection device, and the flow path switching valve; and detecting a malfunction of the cooling system unit, a malfunction of the cooling system unit is detected if a temperature of the coolant is less than or equal to the first temperature threshold value and is greater than the second temperature threshold value, after the fuel cell has stopped generating electric power.

* * * * *